(12) United States Patent
Ramaswamy et al.

(10) Patent No.: US 11,509,571 B1
(45) Date of Patent: *Nov. 22, 2022

(54) COST-BASED ROUTING MESH FOR FACILITATING ROUTING THROUGH AN SD-WAN

(71) Applicant: VMware, Inc., Palo Alto, CA (US)

(72) Inventors: Navaneeth Krishnan Ramaswamy, Chennai (IN); Gopa Kumar, Milpitas, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,342

(22) Filed: Jun. 18, 2021

(30) Foreign Application Priority Data

May 3, 2021 (IN) .............................. 202141020149

(51) Int. Cl.
*H04L 45/24* (2022.01)
*H04L 45/42* (2022.01)
(Continued)

(52) U.S. Cl.
CPC .......... *H04L 45/24* (2013.01); *H04L 12/4633* (2013.01); *H04L 43/045* (2013.01); *H04L 43/16* (2013.01); *H04L 45/42* (2013.01)

(58) Field of Classification Search
None
See application file for complete search history.

(56) References Cited

U.S. PATENT DOCUMENTS

| | | |
|---|---|---|
| 5,652,751 A | 7/1997 | Sharony |
| 5,909,553 A | 6/1999 | Campbell et al. |

(Continued)

FOREIGN PATENT DOCUMENTS

| | | |
|---|---|---|
| CN | 1926809 A | 3/2007 |
| CN | 102577270 A | 7/2012 |

(Continued)

OTHER PUBLICATIONS

Diman et al. "An Efficient Topology and Route Management Approach in SD-WAN Overlays" (Year: 2020).*
Guo, Xiangyi, et al., (U.S. Appl. No. 62/925,193), filed Oct. 23, 2019, 26 pages.

(Continued)

*Primary Examiner* — Younes Naji
(74) *Attorney, Agent, or Firm* — Adeli LLP

(57) ABSTRACT

Some embodiments of the invention provide a method of facilitating routing through a software-defined wide area network (SD-WAN) defined for an entity. A first edge forwarding node located at a first multi-machine site of the entity, the first multi-machine site at a first physical location and including a first set of machines, serves as an edge forwarding node for the first set of machines by forwarding packets between the first set of machines and other machines associated with the entity via other forwarding nodes in the SD-WAN. The first edge forwarding node receives configuration data specifying for the first edge forwarding node to serve as a hub forwarding node for forwarding a set of packets from a second set of machines associated with the entity and operating at a second multi-machine site at a second physical location to a third set of machines associated with the entity and operating at a third multi-machine site at a third physical location. The first edge forwarding node serves as a hub forwarding node to forward the set of packets from the second set of machines to the third set of machines.

20 Claims, 14 Drawing Sheets

(51) Int. Cl.
*H04L 43/16* (2022.01)
*H04L 43/045* (2022.01)
*H04L 12/46* (2006.01)

(56) References Cited

U.S. PATENT DOCUMENTS

| | | | |
|---|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B2 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,693,739 B1 * | 6/2020 | Naseri ................... G06N 20/00 |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |

(56) References Cited

U.S. PATENT DOCUMENTS

| | | |
|---|---|---|
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,381,474 B1 | 7/2022 | Kumar et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |

(56) References Cited

U.S. PATENT DOCUMENTS

| | | |
|---|---|---|
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |

(56) References Cited

U.S. PATENT DOCUMENTS

| | | |
|---|---|---|
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1* | 1/2019 | Houjyo .................. H04B 7/14 |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |

(56) References Cited

U.S. PATENT DOCUMENTS

| | | |
|---|---|---|
| 2019/0103992 A1 | 4/2019 | Cidon et al. |
| 2019/0103993 A1 | 4/2019 | Cidon et al. |
| 2019/0104035 A1* | 4/2019 | Cidon .................. H04L 45/04 |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0327109 A1 | 10/2019 | Guichard et al. |
| 2019/0334813 A1* | 10/2019 | Raj .................. H04L 45/64 |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0092062 A1 | 3/2021 | Dhanabalan et al. |
| 2021/0105199 A1 | 4/2021 | H et al. |
| 2021/0112034 A1 | 4/2021 | Sundararajan et al. |
| 2021/0126830 A1 | 4/2021 | R et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1* | 12/2021 | Zad Tootaghaj ...... H04L 45/125 |

(56) References Cited

U.S. PATENT DOCUMENTS

| | | |
|---|---|---|
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0158923 A1 | 5/2022 | Ramaswamy et al. |
| 2022/0158924 A1 | 5/2022 | Ramaswamy et al. |

FOREIGN PATENT DOCUMENTS

| | | |
|---|---|---|
| CN | 102811165 A | 12/2012 |
| CN | 104956329 A | 9/2015 |
| CN | 106656847 A | 5/2017 |
| CN | 110447209 A | 11/2019 |
| CN | 111198764 A | 5/2020 |
| EP | 1912381 A1 | 4/2008 |
| EP | 3041178 A1 | 7/2016 |
| EP | 3509256 A1 | 7/2019 |
| JP | 2010233126 A | 10/2010 |
| JP | 2017059991 A | 3/2017 |
| RU | 2574350 C2 | 2/2016 |
| WO | 03073701 A1 | 9/2003 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | WO-2021211906 A1 * | 10/2021 |
| WO | 2022005607 A1 | 1/2022 |

OTHER PUBLICATIONS

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Non-Published Commonly Owned U.S. Appl. No. 17/542,413, filed Dec. 4, 2021, 173 pages, VMware, Inc.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/072,764, filed Oct. 16, 2020, 33 pages, VMware, Inc.

Non-Published Commonly Owned U.S. Appl. No. 17/072,774, filed Oct. 16, 2020, 34 pages, VMware, Inc.

Non-Published Commonly Owned U.S. Appl. No. 17/085,893, filed Oct. 30, 2020, 34 pages, VMware, Inc.

Non-Published Commonly Owned U.S. Appl. No. 17/085,916, filed Oct. 30, 2020, 35 pages, VMware, Inc.

Non-Published Commonly Owned U.S. Appl. No. 17/103,614, filed Nov. 24, 2020, 38 pages, VMware, Inc.

Non-Published Commonly Owned U.S. Appl. No. 17/143,092, filed Jan. 6, 2021, 42 pages, VMware, Inc.

Non-Published Commonly Owned U.S. Appl. No. 17/143,094, filed Jan. 6, 2021, 42 pages, VMware, Inc.

Non-Published Commonly Owned U.S. Appl. No. 17/194,038, filed Mar. 5, 2021, 35 pages, VMware, Inc.

Non-Published Commonly Owned U.S. Appl. No. 17/227,016, filed Apr. 9, 2021, 37 pages, VMware, Inc.

Non-Published Commonly Owned U.S. Appl. No. 17/227,044, filed Apr. 9, 2021, 37 pages, VMware, Inc.

Non-Published Commonly Owned U.S. Appl. No. 17/240,890, filed Apr. 26, 2021, 325 pages, VMware, Inc.

Non-Published Commonly Owned U.S. Appl. No. 17/240,906, filed Apr. 26, 2021, 18 pages, VMware, Inc.

Non-Published Commonly Owned Related U.S. Appl. No. 17/351,327 with similar specification, filed Jun. 18, 2021, 48 pages, VMware, Inc.

Non-Published Commonly Owned Related U.S. Appl. No. 17/351,333 with similar specification, filed Jun. 18, 2021, 47 pages, VMware, Inc.

Non-Published Commonly Owned Related U.S. Appl. No. 17/351,340 with similar specification, filed Jun. 18, 2021, 48 pages, VMware, Inc.

Non-Published Commonly Owned Related U.S. Appl. No. 17/351,345 with similar specification, filed Jun. 18, 2021, 48 pages, VMware, Inc.

Non-Published Commonly Owned U.S. Appl. No. 17/361,292, filed Jun. 28, 2021, 35 pages, Nicira, Inc.

Non-Published Commonly Owned U.S. Appl. No. 17/467,378, filed Sep. 6, 2021, 157 pages, VMware, Inc.

Non-Published Commonly Owned U.S. Appl. No. 17/474,034, filed Sep. 13, 2021, 349 pages, VMware, Inc.

Non-Published Commonly Owned U.S. Appl. No. 15/803,964, filed Nov. 6, 2017, 15 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

(56) References Cited

OTHER PUBLICATIONS

Xie, Junfeng, et al., A Survey of Machine Learning Techniques Applied to Software Defined Networking (SDN) Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Non-Published Commonly Owned Related International Patent Application PCT/US2021/065168 with similar specification, filed Dec. 24, 2021, 53 pages, VMware, Inc.

Non-Published Commonly Owned U.S. Appl. No. 17/562,890, filed Dec. 27, 2021, 36 pages, Nicira, Inc.

Non-Published Commonly Owned U.S. Appl. No. 17/572,583, filed Jan. 10, 2022, 33 pages, Nicira, Inc.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Disco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

PCT International Search Report and Written Opinion of Commonly Owned International Patent Application PCT/US2021/065168, dated May 6, 2022, 18 pages, International Searching Authority (EPO).

\* cited by examiner

COST-BASED ROUTING MESH FOR FACILITATING ROUTING THROUGH AN SD-WAN

BACKGROUND

Today, software defined wide area networks (SD-WANs) provide secure access to applications hosted on clouds as well as enterprise datacenters. Typical SD-WAN deployments require a transit node through which the application flows in order to reach destinations (e.g., a cloud application involves branch-to-branch flows via gateways). However, certain challenges arise when handling critical application traffic, such as path impairments between source edge nodes and transit nodes, which can lead to application degradation. Additionally, critical applications that are of SOS nature are also subject to path instabilities and can end up with black out or brown out scenarios that lead to undesirable outcomes.

BRIEF SUMMARY

Some embodiments of the invention provide a method of routing packets through a software-defined wide area network (SD-WAN) defined for an entity. A first edge forwarding node, located at a first multi-machine site of the entity that is located at a first physical location and includes a first set of machines, serves as an edge forwarding node for the first set of machines by forwarding packets between the first set of machines and other machines associated with the entity via other forwarding nodes in the SD-WAN. The first edge forwarding node receives configuration data specifying for the first edge forwarding node to serve as a hub forwarding node for forwarding a set of packets from a second set of machines associated with the entity and operating at a second multi-machine site at a second physical location to a third set of machines associated with the entity and operating at a third multi-machine site at a third physical location. The first edge forwarding node then serves as a hub forwarding node to forward the set of packets to the third set of machines at the third multi-machine site.

In some embodiments, the first edge forwarding node receives the set of packets from the second edge forwarding node through a first tunnel between the first and second edge forwarding nodes, and forwards the packets to their next hop on their way to their destination via a second tunnel between the first edge forwarding node and the next hop. Before forwarding the set of packets through the second tunnel, in some embodiments, the first edge forwarding node removes a first tunnel header identified associated with the first tunnel and inserts a second tunnel header identifier associated with the second tunnel. In some embodiments, the first and second tunnels are secure tunnels (e.g., virtual private network (VPN) tunnels).

In some embodiments, the configuration data is received by the first edge forwarding node from a controller of the SD-WAN. The controller in some embodiments is a centralized controller, while in other embodiments it is a distributed controller with controller agents executing on devices in the SD-WAN (e.g., on the forwarding nodes), while in still other embodiments, the controller is a cloud gateway that performs the functionalities of a controller. Also, in some embodiments, the controller and the cloud gateway share controller functionalities.

The configuration data in some embodiments includes route records specifying multiple sets of routes in which the first edge forwarding node serves as just and edge forwarding element for the first multi-machine site and in which the first edge forwarding node serves as a hub forwarding element for other multi-machine sites, such as the second multi-machine site. In some embodiments, the controller provides different route records specifying different subsets of routes to different edge forwarding nodes in the SD-WAN.

The route records, in some embodiments, are generated by the controller based on routes identified in a routing graph (e.g., a routing-mesh topology model) generated by the controller that shows connections between forwarding nodes in the SD-WAN. In some embodiments, the controller uses the generated routing graph to identify edge forwarding nodes that can serve as hub forwarding nodes for the SD-WAN in order to provide alternate routes between source and destination forwarding nodes when the source forwarding nodes experience certain conditions while forwarding packets to other sites. For example, a particular forwarding node may be unable to connect to a hub forwarding node due to link degradation, congestion at the hub forwarding node because of another tenant, etc., according to some embodiments. In another example, the controller (or cloud gateway) in some embodiments can detect these conditions by pinging (e.g., sending ICMP messages) a hub forwarding node or set of hub forwarding nodes and detecting a slow response. In some embodiments, the controller provides the route records to the edge forwarding nodes proactively in order to allow the edge forwarding nodes to quickly react when experiencing the certain conditions. Alternatively, or conjunctively, the controller in some embodiments provides the route records reactively after detecting (e.g., by receiving a notification from the forwarding nodes) that a particular forwarding node is experiencing the certain conditions.

The conditions, in some embodiments, relate to a degraded operating state of hub forwarding nodes (i.e., transit nodes) and are associated with specified threshold values. In some embodiments, the degraded operating state of a hub forwarding node is caused by degradation of performance attributes such as latency, bandwidth, and throughput. The conditions and their associated threshold values are defined as policy-based routing (PBR) rules that are distributed to the forwarding nodes by the controller, according to some embodiments. In some embodiments, the forwarding nodes include metric generators for generating metrics to resolve these PBR rules and select alternate routes.

In some embodiments, each edge forwarding node in the SD-WAN is associated with a set of SD-WAN profiles that each identify shared sets of parameters. For example, an SD-WAN profile can identify a shared set of security parameters, service parameters, and/or policy parameters, in some embodiments. The controller, in some embodiments, uses these SD-WAN profiles while performing path searches on the routing graph to identify edge forwarding nodes in the routing graph that can serve in a secondary role as a hub forwarding node for the SD-WAN.

In some embodiments, the controller uses the routing graph to compute costs associated with multiple different paths through the routing graph. The computed costs, in some embodiments are link weight scores (i.e., cost scores) computed for different links between forwarding nodes in the routing graph. The weight scores, in some embodiments, are computed as weighted combinations of several computed and provide-specific values, such as a link's (1) computed delay value, (2) computed loss value, (3) provider network-connection cost, and (4) provider compute cost. In some embodiments, different links can have more than one associated cost. For example, the link cost associated with using an edge forwarding node in its primary role as an edge forwarding node is less than the link cost associated with using the edge forwarding node in its secondary role as a hub forwarding node, in some embodiments. The PBR rules used by the forwarding nodes are defined based on the computed weight scores, according to some embodiments (e.g., when latency is greater than N ms, use higher cost link).

The routing graph, in some embodiments, is a set of routing graphs that includes at least a first routing graph that does not include a direct link between the particular edge forwarding node and any edge forwarding node in a group of edge forwarding nodes associated with the entity, and at least a second routing graph that does include direct links between these edge forwarding nodes. In some embodiments, in order to identify edge forwarding nodes that can serve as hub forwarding nodes for the SD-WAN, the controller determines which routing graph results in better routing metrics than each of the other routing graphs in the set.

In some embodiments, in order to serve as a hub forwarding node to send the set of packets from the second set of machines to the third set of machines, the first edge forwarding node receives the packets from a second edge forwarding node of the second site through a first tunnel established between the first and second sites, and forwards the packets to a third edge forwarding node at the third site through a second tunnel between the first and third sites. In some embodiments, prior to forwarding the packets through the second tunnel, the first edge forwarding node removes from the packets a first tunnel header identifier associated with the first tunnel, inserts a second tunnel header identifier that is associated with the second tunnel, and forwards the packets to the third edge forwarding node.

The first edge forwarding node, in some embodiments, serves as the hub forwarding node for only a temporary period of time in order to forward the set of packets. In some embodiments, the first edge forwarding node does not continue to serve as a hub forwarding node for other communication sessions between the second and third sets of machines at the second and third sites, while in other embodiments, the first edge forwarding node serves as a hub forwarding node for all or some communication sessions between the second and third sites, as well as for potentially other sites of the entity.

In some embodiments, the first, second, and third edge forwarding nodes serve as spoke nodes in a hub-spoke architecture that uses a designated hub forwarding node located at a datacenter site associated with the entity. Accordingly, after the first edge forwarding node starts to operate as a hub forwarding node for the second site, in some embodiments, the SD-WAN has two hubs that include the first hub at the first multi-machine site (e.g., also referred to herein as a multi-user compute site) for the second multi-machine site and the second hub at the datacenter site for multiple edge forwarding nodes at multiple multi-machine sites of the entity. In some embodiments, the first edge forwarding node serves as hub forwarding node for a particular multi-machine site of the entity that establishes multiple tunnels with the first edge forwarding node, each tunnel used for a communication session between a machine at the particular multi-machine site and a machine at another multi-machine site of the entity.

The first multi-machine site of the entity, in some embodiments, is a first branch site of multiple branch sites of the entity, in some embodiments, and the first physical location is one of multiple geographically dispersed physical locations. Branch sites (e.g., multi-user compute sites), in some embodiments, are locations that have multiple user computes and/or other user-operated devices and serve as source computers and devices for communicating with other computers and devices at other sites (e.g., other branch sites, datacenter sites, etc.). The branch sites, in some embodiments, can also include servers that are not operated by users. In some embodiments, the second multi-machine site is a multi-tenant datacenter, such as a Software as a Service (SaaS) provider's datacenter. When the multi-tenant datacenter is a SaaS provider's datacenter, in some embodiments, the second edge forwarding node is a multi-tenant gateway forwarding node.

In some embodiments, the edge forwarding nodes associated with the SD-WAN can include an edge forwarding node associated with a branch site of the SD-WAN, a gateway forwarding node for a private datacenter, a multi-tenant gateway forwarding node associated with a public cloud, a multi-tenant gateway forwarding node associated with a SaaS provider cloud, and a hub forwarding node that provides connectivity between spoke edge forwarding nodes in the hub-and-spoke configuration of the SD-WAN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of routing packets through a software-defined wide area network (SD-WAN) defined for an entity by augmenting the roles of SD-WAN devices. Examples of roles for SD-WAN devices include SD-WAN edge forwarding nodes, SD-WAN hub forwarding nodes, and SD-WAN gateway forwarding nodes. In some embodiments, an SD-WAN device's role can include a primary function and a secondary function, where the secondary function is either always there, or requested on demand. In some embodiments, these roles are based on context. For example, a controller or controller cluster in some embodiments can associate SD-WAN forwarding nodes with heuristic metrics, such as geolocation, number of paths to a hub, path metrics, etc.

In its primary function in its role as an edge forwarding node, for example, a first SD-WAN edge forwarding node that is located at a first multi-machine site (e.g., also referred to herein as a multi-user compute site) of an entity that is located at a first physical location and includes a first set of machines, can forward packets from the first set of machines operating at the first multi-machine site to other forwarding nodes in the SD-WAN for forwarding to other machines associated with the entity. Based on configuration data (i.e., route records) from the controller, the first SD-WAN edge forwarding node can subsequently operate in its secondary function as a hub for the second multi-machine site and relay the set of packets from the second set of machines operating at the second multi-machine site to a third set of machines associated with the entity.

Figure 1:
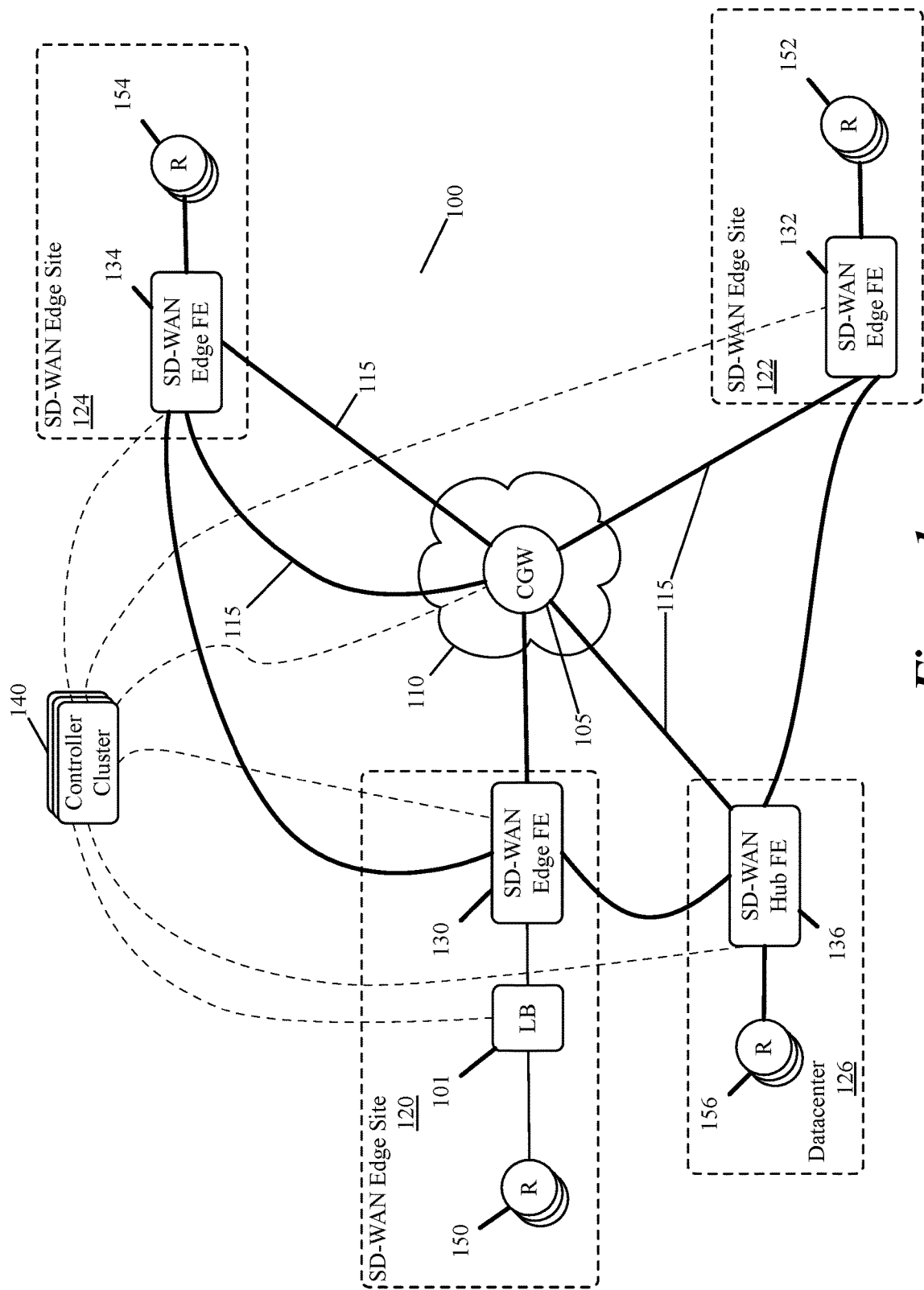
FIG. 1 illustrates an example of a virtual network that is created for a particular entity using a hub that is deployed in a public cloud datacenter of a public cloud provider, according to some embodiments.

FIG. 1 illustrates an example of a virtual network 100 that is created for a particular entity using SD-WAN forwarding elements deployed at branch sites, datacenters, and public clouds. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

In FIG. 1, the SD-WAN forwarding elements include cloud gateway 105 and SD-WAN forwarding elements 130, 132, 134, 136. The cloud gateway (CGW) in some embodiments is a forwarding element that is in a private or public datacenter 110. The CGW 105 in some embodiments has secure connection links (e.g., tunnels) with edge forwarding elements (e.g., SD-WAN edge forwarding elements (FEs) 130, 132, 134, and 136) at the particular entity's multi-machine sites (e.g., SD-WAN edge sites 120, 122, and 124), such as multi-user compute sites (e.g., branch offices or other physical locations having multi user computers and other user-operated devices and serving as source computers and devices for requests to other machines at other sites), datacenters (e.g., locations housing servers), etc. These multi-machine sites are often at different physical locations (e.g., different buildings, different cities, different states, etc.).

Four multi-machine sites 120-126 are illustrated in FIG. 1, with three of them being branch sites 120-124, and one being a datacenter 126. Each branch site is shown to include an edge forwarding node 130-134, while the datacenter site 126 is shown to include a hub forwarding node 136. The datacenter SD-WAN forwarding node 136 is referred to as a hub node because in some embodiments this forwarding node can be used to connect to other edge forwarding nodes of the branch sites 120-124. The hub node in some embodiments uses or has one or more service engines to perform services (e.g., middlebox services) on packets that it forwards from one branch site to another branch site. In some embodiments, when an edge forwarding node takes on the role of a hub forwarding node (e.g., based on route records provided by the controller cluster), the controller cluster provides service rules to the edge forwarding node to enable this node, or a service engine used by this node, to perform service operations that are to be performed by the hub forwarding node. The hub node also provides access to the datacenter resources 156, as further described below.

Each edge forwarding element (e.g., SD-WAN edge FEs 130-134) exchanges packets with one or more cloud gateways 105 through one or more connection links 115 (e.g., multiple connection links available at the edge forwarding element). In some embodiments, these connection links include secure and unsecure connection links, while in other embodiments they only include secure connection links. As shown by edge node 134 and gateway 105, multiple secure connection links (e.g., multiple secure tunnels that are established over multiple physical links) can be established between one edge node and a gateway.

When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc. In some embodiments, the different physical links between the edge node 134 and the cloud gateway 105 are the same type of links (e.g., are different MPLS links).

In some embodiments, one edge forwarding node 130-134 can also have multiple direct links 115 (e.g., secure connection links established through multiple physical links) to another edge forwarding node 130-134, and/or to a datacenter hub node 136. Again, the different links in some embodiments can use different types of physical links or the same type of physical links. Also, in some embodiments, a first edge forwarding node of a first branch site can connect to a second edge forwarding node of a second branch site (1) directly through one or more links 115, (2) through a cloud gateway or datacenter hub to which the first edge forwarding node connects through two or more links 115, or (3) through another edge forwarding node of another branch site that can augment its role to that of a hub forwarding node, as will be described in more detail below. Hence, in some embodiments, a first edge forwarding node (e.g., 134) of a first branch site (e.g., 124) can use multiple SD-WAN links 115 to reach a second edge forwarding node (e.g., 130) of a second branch site (e.g., 120), or a hub forwarding node 136 of a datacenter site 126.

The cloud gateway 105 in some embodiments is used to connect two SD-WAN forwarding nodes 130-136 through at least two secure connection links 115 between the gateway 105 and the two forwarding elements at the two SD-WAN sites (e.g., branch sites 120-124 or datacenter site 126). In some embodiments, the cloud gateway 105 also provides network data from one multi-machine site to another multi-machine site (e.g., provides the accessible subnets of one site to another site). Like the cloud gateway 105, the hub forwarding element 136 of the datacenter 126 in some embodiments can be used to connect two SD-WAN forwarding nodes 130-134 of two branch sites through at least two secure connection links 115 between the hub 136 and the two forwarding elements at the two branch sites 120-124.

In some embodiments, each secure connection link between two SD-WAN forwarding nodes (i.e., CGW 105 and edge forwarding nodes 130-136) is formed as a VPN tunnel between the two forwarding nodes. In this example, the collection of the SD-WAN forwarding nodes (e.g., forwarding elements 130-136 and gateways 105) and the secure connections 115 between the forwarding nodes forms the virtual network 100 for the particular entity that spans at least the public or private cloud datacenter 110 to connect the branch and datacenter sites 120-126.

In some embodiments, secure connection links are defined between gateways in different public cloud datacenters to allow paths through the virtual network to traverse from one public cloud datacenter to another, while no such links are defined in other embodiments. Also, in some embodiments, the gateway 105 is a multi-tenant gateway that is used to define other virtual networks for other entities (e.g., other companies, organizations, etc.). Some such embodiments use tenant identifiers to create tunnels between a gateway and edge forwarding element of a particular entity, and then use tunnel identifiers of the created tunnels to allow the gateway to differentiate packet flows that it receives from edge forwarding elements of one entity from packet flows that it receives along other tunnels of other entities. In other embodiments, gateways are single-tenant and are specifically deployed to be used by just one entity.

FIG. 1 illustrates a cluster of controllers 140 that serve as a central point for managing (e.g., defining and modifying) configuration data that is provided to the edge nodes and/or gateways to configure some or all of the operations. In some embodiments, this controller cluster 140 is in one or more public cloud datacenters, while in other embodiments it is in one or more private datacenters. In some embodiments, the controller cluster 140 has a set of manager servers that define and modify the configuration data, and a set of controller servers that distribute the configuration data to the edge forwarding elements (FEs), hubs and/or gateways. In some embodiments, the controller cluster 140 directs edge forwarding elements and hubs to use certain gateways (i.e., assigns a gateway to the edge forwarding elements and hubs). In some embodiments, some or all of the controller cluster's functionality is performed by a cloud gateway (e.g., cloud gateway 105).

The controller cluster 140 also provides next hop forwarding rules and load balancing criteria in some embodiments. As mentioned above, the controller cluster 140 also provides service rules to edge forwarding nodes that can serve as hub forwarding nodes, in some embodiments, in order to enable these nodes, or service engines used by these nodes, to perform service operations on the packets that are to be performed by the hub forwarding node. In some embodiments, the controller cluster provides the configuration data (e.g., route records, forwarding rules, etc.) to the edge forwarding nodes proactively in order to allow the edge forwarding nodes to quickly react when experiencing certain conditions that necessitate using alternate routes. Alternatively, or conjunctively, the controller in some embodiments provides the configuration data reactively after detecting (e.g., by receiving a notification from the forwarding nodes) that a particular forwarding node is experiencing the certain conditions.

The conditions, in some embodiments, relate to degraded operational states of hub forwarding nodes and are associated with threshold values defined in the forwarding rules (e.g., policy-based routing (PBR) rules). In some embodiments, the degraded operational states of hub forwarding nodes can be due to issues with latency, bandwidth, and/or throughput. For example, a forwarding rule may specify that a first edge forwarding node at a first site should use a second edge forwarding node at a second site to forwarding a set of packets to a third site when the throughput of a designated hub forwarding node used by the first edge forwarding node does not fall within a threshold value range defined in the forwarding rule.

In some embodiments, the controller detects the degraded operational state of the hub forwarding node and signals to the first edge forwarding node to use an alternate route through the second edge forwarding node, while in other embodiments, the first edge forwarding node automatically uses the second edge forwarding node as a hub according to the route records. FIGS. 3, 4, 6, 8, and 10 illustrate processes for facilitating routing by designating edge forwarding nodes as hub forwarding nodes in some embodiments, and will be described below with reference to FIGS. 2, 5, 7, and 9.

Figure 2:
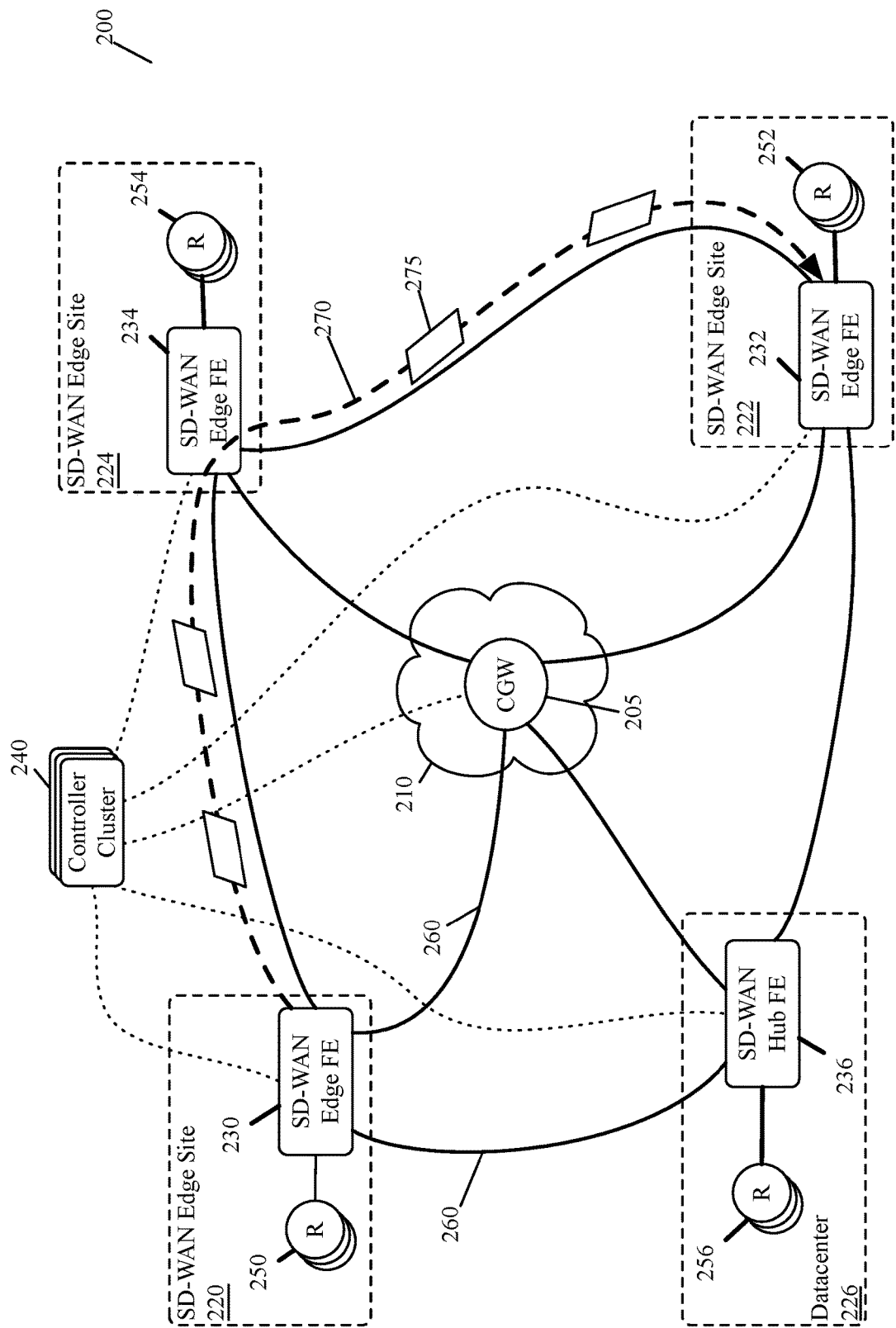
FIG. 2 illustrates an example of a virtual network in which a particular edge forwarding node has been designated as a hub forwarding node to facilitate a communications session between two edge forwarding nodes, according to some embodiments.

FIG. 2 illustrates another example of a virtual network 200 in some embodiments that is created for a particular entity using SD-WAN forwarding elements deployed at branch sites, datacenters, and public clouds. Like the virtual network 100, the SD-WAN forwarding elements of the virtual network 200 include SD-WAN edge forwarding nodes 230-234, cloud gateway 205, and SD-WAN hub forwarding node 236. The cloud gateway 205 in some embodiments is a forwarding element that is in a private or public datacenter 210. In some embodiments, the cloud gateway 205 has secure connection links (e.g., tunnels) with edge forwarding elements at the entity's different branch sites and datacenters. In this example, the edge forwarding nodes 230-234 are located at respective branch sites 220-224, while the hub forwarding node 236 is located at the datacenter 226.

While the cloud gateway 105 and hub forwarding node 236 can provide forwarding services for the branch sites 220-224, in some embodiments, these connections experience issues sometimes caused by heavy traffic loads coming from other sites in the SD-WAN. Accordingly, the edge forwarding nodes 230-234 in some embodiments are requested or instructed to serve as hub forwarding nodes to facilitate communication sessions between other sites in the SD-WAN.

Figure 3:
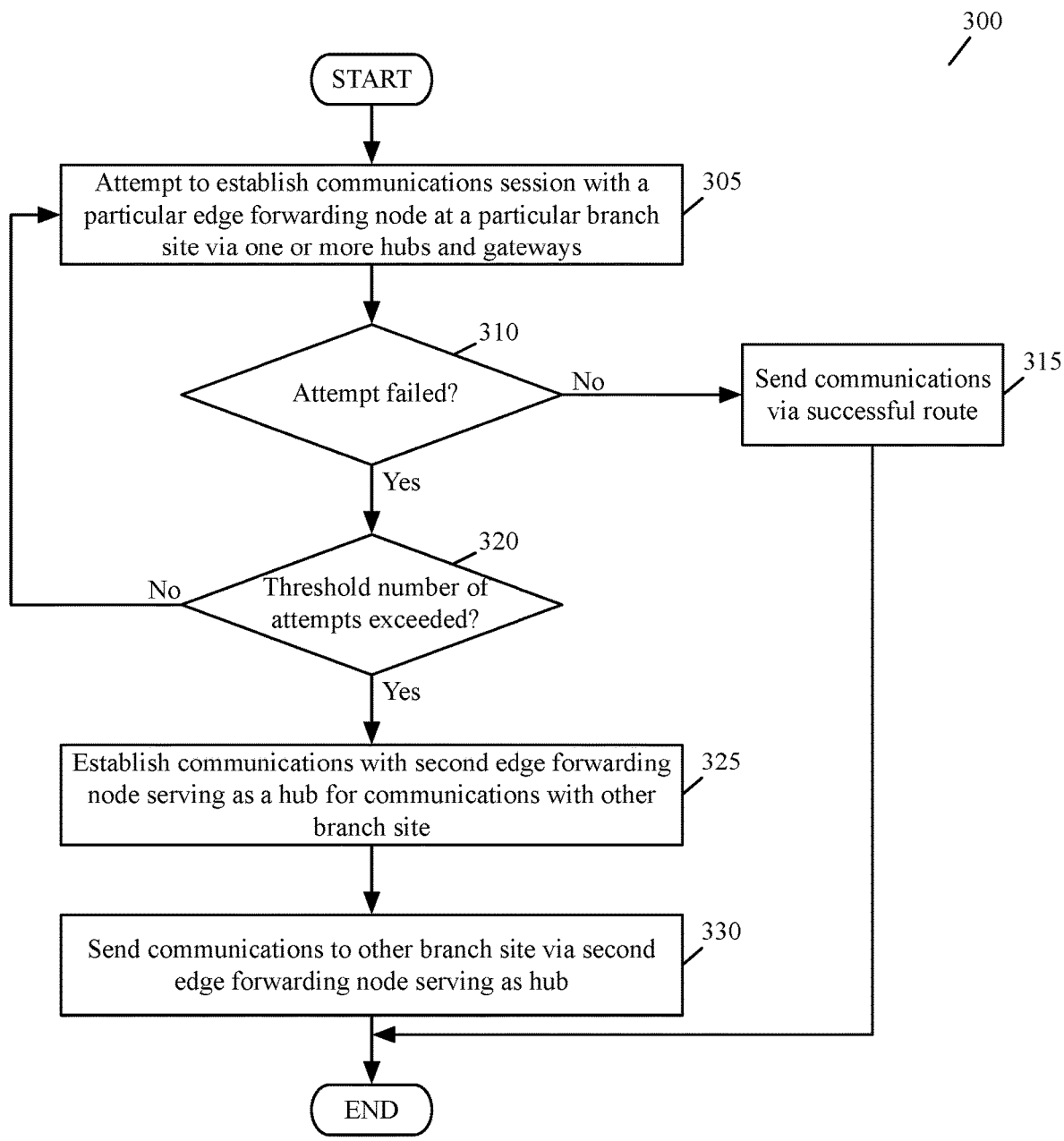
FIG. 3 illustrates a process performed by a forwarding node in a virtual network when attempting to establish a communications session with a particular destination, according to some embodiments.

FIG. 3 illustrates a process performed by an edge forwarding node at a branch site, in some embodiments, when attempting to establish communications with a destination (e.g., any destination device based on routing). The process 300 starts, at 305, by attempting to establish a communications session with a particular forwarding node at a particular site via one or more hubs or gateways. For example, in the virtual network 200, the edge forward node 230 at the branch site 220 can attempt to communicate with the edge forwarding node 232 at the branch site 222 through the cloud gateway 205 and the hub forwarding node 236 via connection link 260.

Next, at 310, the edge forwarding node determines whether the attempt to establish the communications session failed. In some embodiments, for example, when a different branch site of the same or different entity/tenant is sending large amounts of data via the hub or gateway forwarding nodes, the connections (e.g., links) with other branch sites become less reliable (i.e., degraded). Also, in some embodiments, the attempts to connect fail because the hub or gateway forwarding nodes may be experiencing scheduled or unscheduled downtime (e.g., for maintenance).

When the edge forwarding node determines at 310 that the attempt did not fail, the process transitions to 315 to send communications (i.e., packets) via the successful route. The process then ends. Otherwise, when the edge forwarding node determines at 310 that the attempt did fail, the process transitions to 320 to determine whether a threshold number of attempts has been exceeded. In some embodiments, the threshold number of attempts is predefined by a user (e.g., network administrator), and implemented as a fault tolerance policy, or as a PBR rule, as will be described below for FIG. 4.

When the edge forwarding node determines that the threshold of failed attempts has not been exceeded, the process returns to 305 to continue to attempt to establish the communications session via hub and gateway forwarding nodes. Alternatively, when the edge forwarding node determines at 320 that the threshold number of failed attempts has been exceed, the process transitions to 325 to establish a communications session with an intervening edge forwarding node at another branch site. For example, the edge forwarding node 230 can establish a communications session with the edge forwarding node 234 serving as a hub for a communications session between the edge forwarding node 230 and the edge forwarding node 232.

Next, at 330, the edge forwarding node starts forwarding packets to the intervening edge forwarding node, which is now serving as a hub forwarding node, for delivery to the particular forwarding node at the particular site. For example, in the virtual network 200, the edge forwarding node 230 is shown sending packets 275 along the route 270, which passes through the edge forwarding node 234 for delivery to the edge forwarding node 232. The process then ends.

Figure 4:
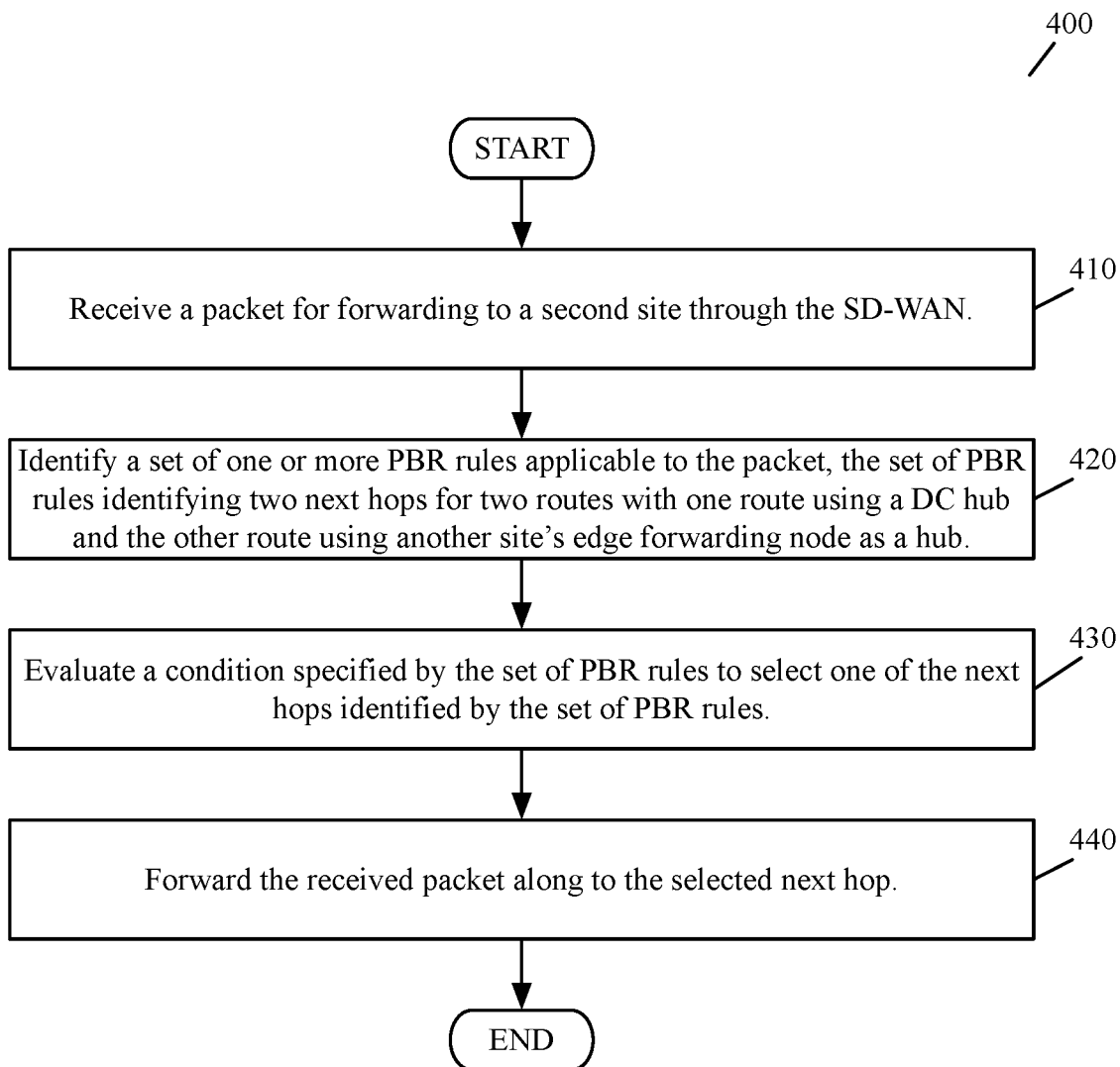
FIG. 4 illustrates a process performed by an edge forwarding node at a branch site, in some embodiments, when attempting to establish communications with a destination.

FIG. 4 illustrates another process performed by an edge forwarding node at a branch site, in some embodiments, when attempting to establish communications with a destination (e.g., any destination device based on routing). The process 400 starts, at 410, when the edge forwarding node of a branch site receives a packet (e.g., from a source machine at the branch site) for forwarding to a second site through the SD-WAN.

Next, the process identifies, at 420, a set of one or more PBR rules that are applicable to the packet and that identify two next hops for two routes to the destination, with one route using a designated hub forwarding node at a datacenter site and the other route using another edge forwarding node at another site. In some embodiments, the edge forwarding node identifies applicable PBR rules based on five tuple identifiers (e.g., source and destination address, source and destination port number, and protocol) associated with the packet, as well as based on performance attributes of the designated hub forwarding node (e.g., latency, bandwidth, and throughput).

After identifying the set of PBR rules, the process evaluates, at 430, a condition specified by the set of PBR rules to select one of the next hops identified by the set of PBR rules. For example, the PBR rules, in some embodiments, specify threshold values for the performance attributes. For example, a PBR rule may specify that when the designated hub forwarding node has a latency greater than N ms, the other edge forwarding node serving as a hub forwarding node should be the next hop for forwarding the packet. In another example, a PBR rule may specify that when the edge forwarding node experiences greater than N number of failed attempts to connect to the designated hub forwarding node, the other edge forwarding node serving as a hub forwarding node should be the next hop for forwarding the packet. The process then forwards, at 440, the received packet along to the selected next hop. Following 440, the process 400 ends.

Figure 5:
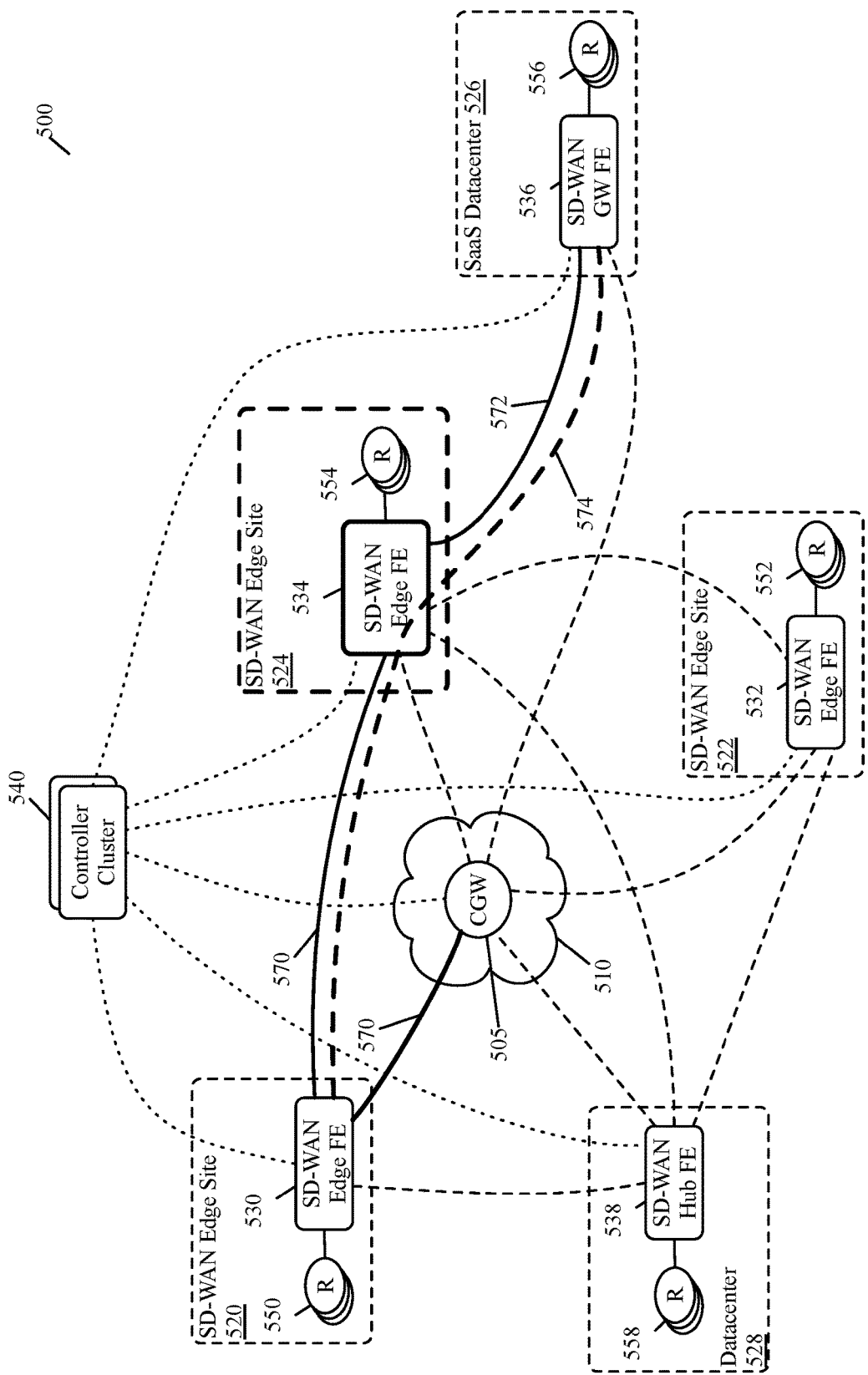
FIG. 5 illustrates an example of a virtual network in which a particular edge forwarding node has been designated as a hub forwarding node to facilitate a communications session between a particular edge forwarding node and a SaaS datacenter, according to some embodiments.

FIG. 5 illustrates a virtual network 500 that includes a controller cluster 540, multiple branch sites (e.g., 520, 522, and 524), each branch site having a respective SD-WAN edge forwarding node (e.g., 530, 532, and 534) and a set of resources (e.g., 550, 552, and 554). The virtual network 500 also includes a datacenter 528 (public or private) with resources 558 and an SD-WAN hub forwarding node 538, a cloud gateway 505 in a public cloud 510, and a SaaS datacenter 526 with resources 556 and an SD-WAN gateway forwarding node 536. FIG. 5 will be described below with reference to FIG. 6.

Figure 6:
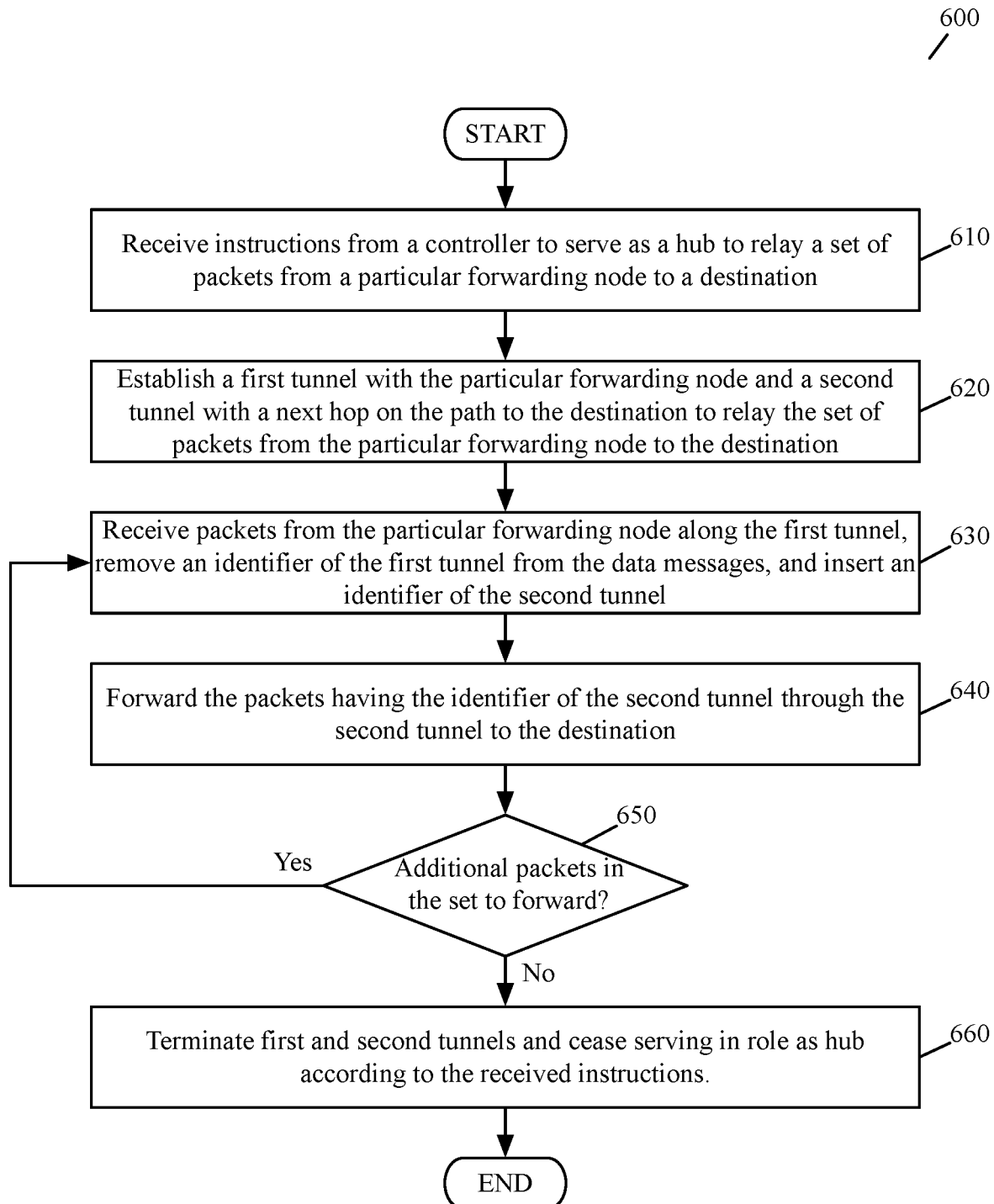
FIG. 6 illustrates a process performed by a forwarding node in a virtual network that acts as a hub forwarding node to facilitate a communications session between a particular source and a particular destination, according to some embodiments.

FIG. 6 illustrates a process 600 performed by an edge forwarding node of a branch site serving as a hub forwarding node to relay communications between other sites internal and external to the virtual network in some embodiments. The process 600 starts, at 610, when an edge forwarding node (i.e., a first edge forwarding node) of a branch site receives instructions from a controller to serve as a hub forwarding node to relay a set of packets from a particular forwarding node at a particular site to a destination. For example, in the virtual network 500, the edge forwarding node 530 at the branch site 520 can establish a communications session with the edge forwarding node 534 at the branch site 524 in order to have the edge forwarding node 534 serve as a hub for relaying a set of packets from the edge forwarding node 530 to the gateway forwarding node 536 following a number of failed attempts to communicate through the cloud gateway 505, in some embodiments. In some embodiments, the instructions include route records generated by the controller based on routes identified in one or more routing graphs for the SD-WAN.

Following receipt of the instructions at 610, the edge forwarding node establishes, at 620, a first tunnel with the particular forwarding node of the particular site and a second tunnel with a next hop on the path to the destination in order to relay the set of packets from the particular forwarding node to the destination. For example, the edge forwarding node 532 can establish a tunnel with the edge forwarding node 530 via the link 570, and a tunnel with the gateway forwarding node 536 (i.e., destination) on the link 572.

The edge forwarding node next receives, at 630, packets from the particular forwarding node along the first tunnel, removes an identifier of the first tunnel from the packets, and inserts an identifier of the second tunnel. The edge forwarding node then forwards, at 640, the packets having the identifier of the second tunnel through the second tunnel to the destination. For example, the edge forwarding node 534 can receive packets from the edge forwarding node 530 and forward the packets to the destination gateway forwarding node 536 along the path illustrated by the dashed line 574.

Next, at 650, the edge forwarding node determines whether there are additional packets in the set of packets to be forwarded. When the edge forwarding node determines that there are additional packets to forward in the communications session (i.e., the session has not yet terminated), the process returns to 630 to receive the packets from the particular forwarding node.

Otherwise, when the edge forwarding node determines there are no additional packets to forward (i.e., the communications session has terminated), the process transitions to 660 to terminate the first and second tunnels and cease serving in the role as a hub according to the received instructions. For example, in some embodiments, the edge forwarding node operating in a hub role is configured to only remain in that role as the hub for the length of time it takes to relay the set of packets for which the tunnel was initially established, while in other embodiments, the edge forwarding node continues to operate in the hub role for a particular set of communications sessions, or in still other embodiments, the edge forwarding node operates in the hub role until it receives additional instructions (e.g., from the controller) to stop. Following 660, the process ends.

Figure 7:
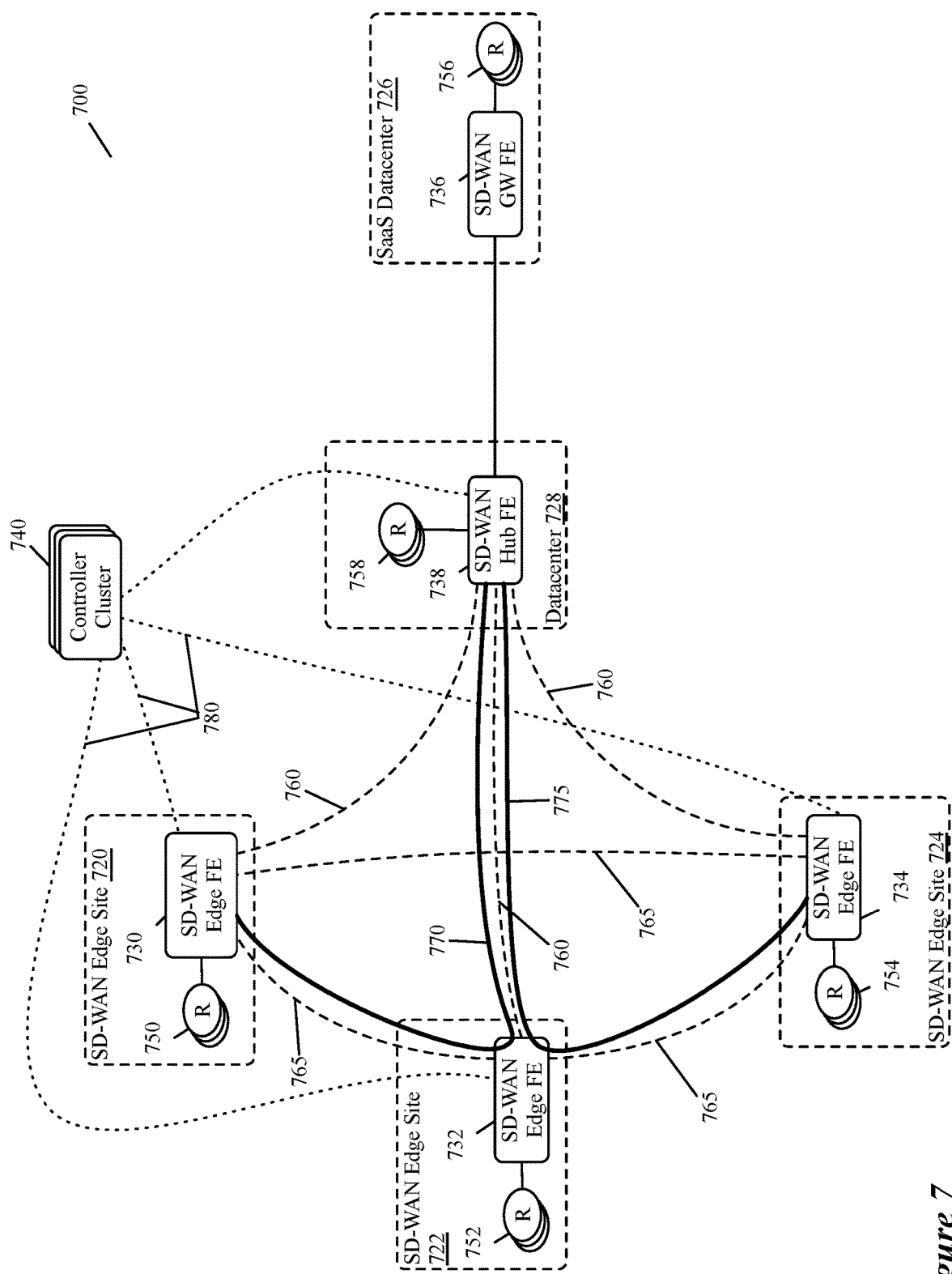
FIG. 7 illustrates an example of a virtual network in which a particular edge forwarding node has been designated as a hub forwarding node for other edge forwarding nodes in the virtual network, according to some embodiments.

FIG. 7 illustrates another example of a virtual network in some embodiments. The virtual network 700 includes a controller cluster 740, a set of branch sites (e.g., 720, 722, and 724) that each include a set of resources (e.g., 750, 752, and 754) and an SD-WAN edge forwarding node (e.g., 730, 732, and 734), and a datacenter 728 that includes resources 758 and a hub forwarding node 738. The hub forwarding node 738 at the datacenter 728 serves to connect each of the branch sites 720-724 to the gateway forwarding node 736 of the external SaaS datacenter 726 to allow the branch sites to access resources 756 of the SaaS datacenter. FIG. 7 will be described in further detail below with reference to FIG. 8.

Figure 8:
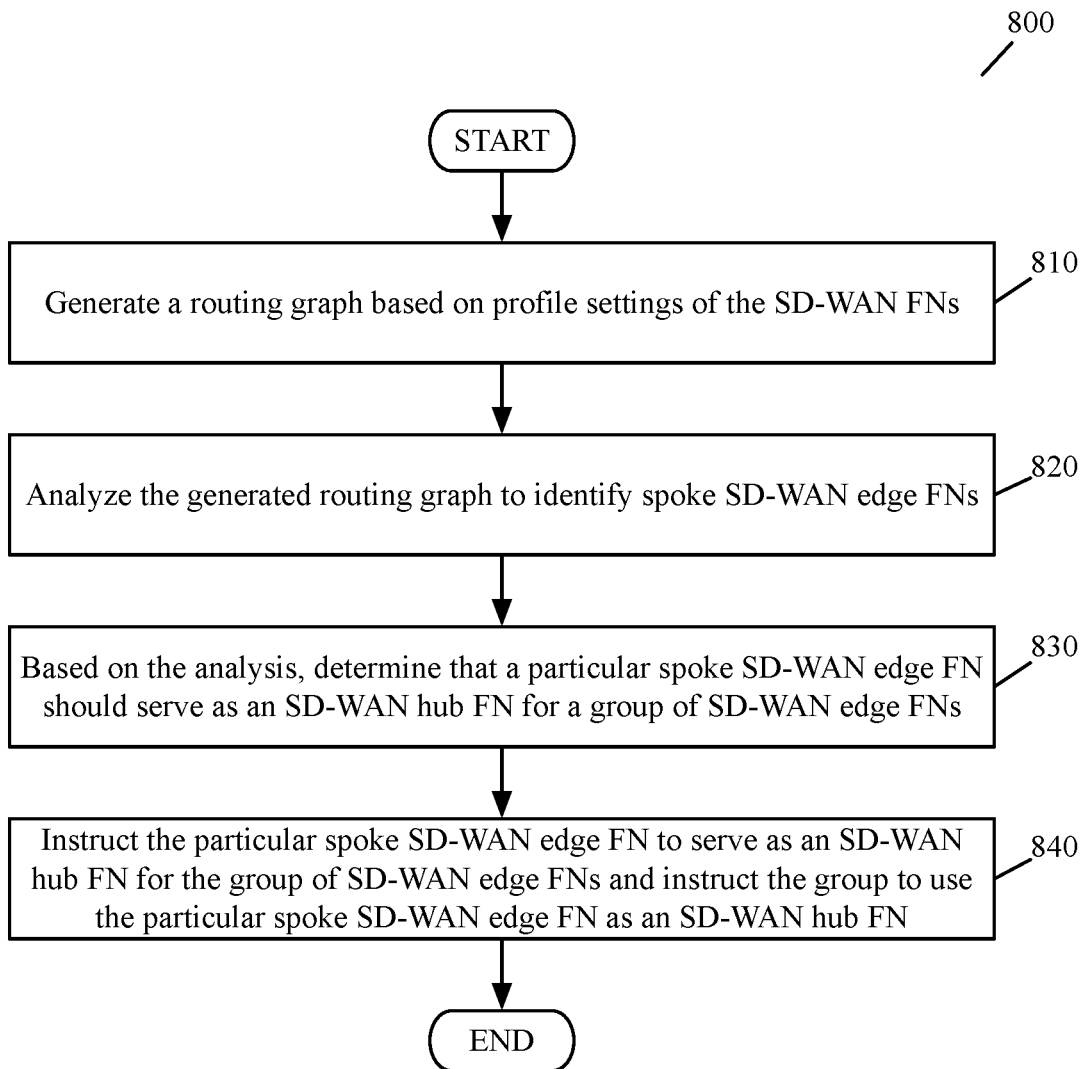
FIG. 8 illustrates a process performed by a controller or controller cluster in a virtual network to identify potential edge forwarding nodes able to serve as hub forwarding nodes to provide optimal routing for other forwarding nodes in the virtual network, according to some embodiments.

FIG. 8 illustrates a process performed by a controller or controller cluster in some embodiments. The process 800 is performed as a reactive process in some embodiments (i.e., in response to detection of poor conditions in the SD-WAN), while in other embodiments, the process is a proactive process (i.e., performed prior to any detection of poor conditions). The process 800 starts at 810 when the controller generates a routing graph (e.g., routing-mesh topology model) based on profile settings of SD-WAN forwarding nodes in order to identify available routes between devices in and out of the SD-WAN. For example, the controller cluster 740 may identify all of the connections 760 between the branch sites 720-724 and the datacenter 728, as well as the connections 765 between the branch sites. An example routing graph will be described below with reference to FIGS. 11A-11G.

Next, the controller analyzes, at 820, the routing graph to identify spoke SD-WAN edge forwarding nodes. In the virtual network 700, the controller cluster 740 may identify each of the edge forwarding nodes 730-734 as spokes around the hub forwarding node 738. Based on the analysis, the controller determines, at 830, that a particular spoke SD-WAN edge forwarding node should serve as an SD-WAN hub forwarding node for a group of SD-WAN edge forwarding nodes. For example, though each of the edge forwarding nodes 730-734 have been identified as spokes, the controller 740 in some embodiments may determine that the optimal route for the edge forwarding nodes 730 and 734 (e.g., in case these nodes are unable to reach the hub forwarding node 738 directly) would be through the edge forwarding node 732 as illustrated by the bold routes 770 and 775.

After determining that the particular spoke edge forwarding node should serve as a hub forwarding node for a group of edge forwarding nodes, the controller instructs, at 840, the particular spoke edge forwarding node to serve as a hub forwarding node for the group of SD-WAN edge forwarding nodes, and instructs the group to use the particular spoke edge forwarding node as a hub forwarding node. For example, the controller cluster 740 can use the connections 780 to send respective instructions to each of the edge forwarding nodes 730-734. In some embodiments, the controller instructs the group of edge forwarding nodes to use the designated hub forwarding node only for a specified amount of time (e.g., for a particular set of communications sessions).

The instructions, in some embodiments, include route records generated by the controller that identify different paths using the particular spoke edge forwarding node as a hub forwarding node. In some embodiments, the route records include two different sets of route records generated based on first and second routing graphs, with the first set including routes where the particular spoke edge forwarding node only serves as an edge forwarding node, and the second set including routes where the particular spoke edge forwarding node serves as an edge forwarding node and as a hub forwarding node. Alternatively, or conjunctively, the route records in some embodiments include two different sets of route records based one routing graph generated by the controller, with the first set of route records further based on a first set of routes associated with a first cost when using the particular spoke edge forwarding node as an edge forwarding node, and the second set of route records further based on a second set of routes associated with a second cost when using the particular spoke edge forwarding node as a hub forwarding node. In some embodiments, the controller also sends with the route records a list of nodes identified in the routing graph as nodes that can serve as hubs to the forwarding nodes in the SD-WAN. After providing the instructions to the particular spoke edge forwarding node, the process 800 ends.

Figure 9:
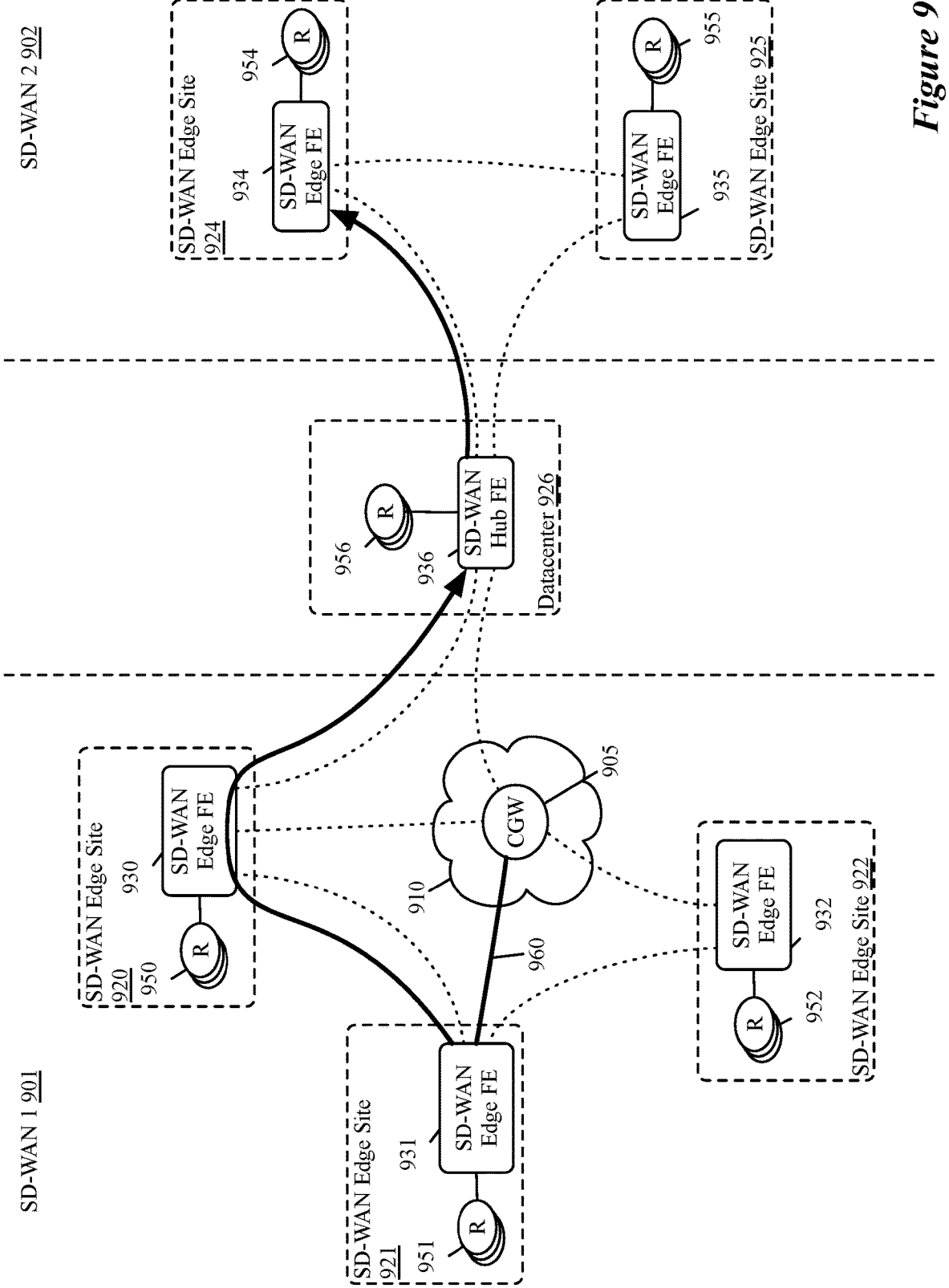
FIG. 9 illustrates an example in which a particular edge forwarding node in a first SD-WAN has been designated as a hub forwarding node to facilitate a communications session between another edge forwarding node in the first SD-WAN and an edge forwarding node in a second SD-WAN, according to some embodiments.

FIG. 9 illustrates an example of a communications session between sites in different SD-WANs that is relayed by an edge forwarding node. The first SD-WAN 901, includes a set of branch sites (e.g., 920, 921, and 922) each with a set of resources (e.g., 950, 951, and 952) and an edge forwarding node (e.g., 930, 931, and 932), as well as a cloud gateway 905 in a public cloud 910. The second SD-WAN 902 includes a pair of branch sites (e.g., 924 and 925) each with a set of resources (e.g., 954 and 955) and an edge forwarding node (e.g., 934 and 935). The first and second SD-WANs 901 and 902 are connected by a public datacenter 926 that includes a set of resources 956 and a hub forwarding node 936. FIG. 9 will be further described below with reference to FIG. 8.

Figure 10:
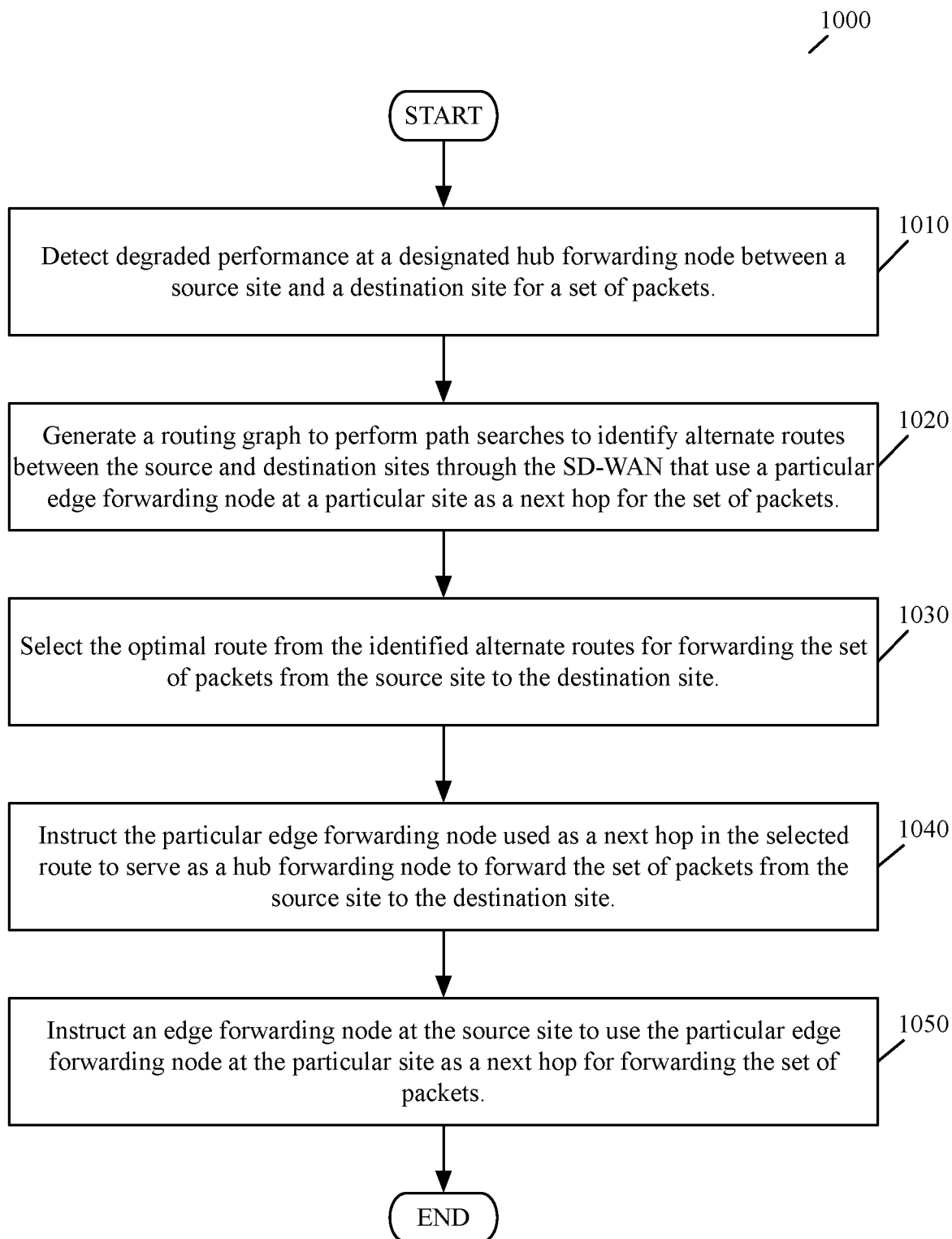
FIG. 10 illustrates a process performed by a controller or controller cluster in a virtual network to identify potential edge forwarding nodes able to serve as hub forwarding nodes to provide optimal routing for other forwarding nodes in the virtual network in response to detected failed communications attempts by another forwarding node in the virtual network, according to some embodiments.

FIG. 10 illustrates a process performed by a controller or controller cluster in some embodiments to facilitate routing between forwarding nodes internal and external to an SD-WAN. The process 1000 starts at 1010 when the controller detects degraded performance at a designated hub forwarding node between a source site and a destination site. For example, a controller cluster (not pictured) for the SD-WAN 901 may detect that the performance of the cloud gateway 905, and/or the link 960 between the edge forwarding node 931 and the cloud gateway 905, is degraded. In some embodiments, the controller cluster detects such network events by receiving notifications from the different forwarding elements (e.g., edge forwarding node 931, cloud gateway 905, etc.) regarding the network events.

Next, the controller generates, at 1020, a routing graph (i.e., the routing graph generated in the process 800) to perform path search to identify alternate routes between the source and destination sites through the SD-WAN that use a particular edge forwarding node at a particular site as a next hop (i.e., instead of the designated hub forwarding node) for the set of packets. For example, a controller cluster (not pictured) for the SD-WAN 901 may identify the edge forwarding node 930 as a spoke edge forwarding node able to serve as a hub for a communications session between the edge forwarding node 931 in the SD-WAN 901 and a destination, such as the edge forwarding node 934 of the branch site 924 in the SD-WAN 902.

The controller cluster then selects, at 1030, the optimal route from the identified alternate routes for forwarding the set of packets from the source site to the destination site. In some embodiments, each route has an associated cost, and the selected optimal route is the route having the lowest cost, while in other embodiments, the optimal route is not the route having the lowest cost.

The controller cluster instructs, at 1040, the particular edge forwarding node used as a next hop in the selected route to serve as a hub forwarding node to forward the set of packets from the source site to the destination site. For example, a controller cluster (not pictured) can instruct the edge forwarding node 930 to serve as a hub for the edge forwarding node 931 in order for the edge forwarding node 931 to forward the set of packets to the edge forwarding node 934 in the second SD-WAN 902, such that the packets are forwarded from the edge forwarding node 930 serving as a hub, to the hub forwarding node 936 of the datacenter 926, and finally to the edge forwarding node 934.

Additionally, the controller cluster instructs, at 1050, an edge forwarding node at the source site to use the particular edge forwarding node at the particular site as a next hop for forwarding the set of packets. In some embodiments, the controller cluster instructs the edge forwarding node to use the particular edge forwarding node as a next hop only for the set of packets, while in other embodiments, the controller cluster instructs the edge forwarding node to use the particular edge forwarding node as a next hop for additional sets of packets. The process then ends.

In some embodiments, the cloud gateway 905 performs some or all of the functionalities of the controller cluster described above. For example, in some embodiments, the cloud gateway is responsible for collecting network event-related data from other forwarding elements connected by the SD-WAN and provides this data to the controller cluster, while in other embodiments, the cloud gateway collects the data, analyzes the data to detect any problems, and provides solutions (e.g., by providing alternate routes for forwarding packets).

While the processes in FIGS. 3-10 are described with reference to the elements in FIGS. 2-9, the particular destination for each of these processes can be any of an SD-WAN edge forwarding node at a branch site, an SD-WAN gateway forwarding node for a private datacenter, a multi-tenant SD-WAN gateway forwarding node associated with a public cloud, a multi-tenant SD-WAN gateway forwarding node associated with a SaaS provider cloud, or an SD-WAN hub forwarding node that provides connectivity between spoke SD-WAN edge forwarding nodes in a hub-and-spoke configuration of the SD-WAN.

As mentioned above, the controller or controller cluster in some embodiments proactively or reactively creates and examines routing graphs in order to determine routes for packets between SD-WAN edge forwarding nodes. In some embodiments, the controller generates one or more routing graphs to perform path searches to identify routes through the SD-WAN forwarding nodes (e.g., edge nodes, hub nodes, cloud gateway nodes, etc.) between SD-WAN sites that are sources and destinations of packet flows. In some embodiments, the controller also provides a list of forwarding nodes that can be used as hub forwarding nodes to each forwarding node in the SD-WAN. Additional details regarding generating routing graphs and performing path searches on those routing graphs for identifying paths through the SD-WAN can be found in U.S. Pat. No. 11,005,684.

FIGS. 11A-11G illustrate an example of a routing graph generated by a controller, along with a subset of potential desirable paths transposed on the routing graph from which the controller can select one or more edge forwarding nodes to operate in a secondary function as hub forwarding nodes. While the routing graph generation and analyses are described below as being performed by the controller, some or all of these functionalities, in some embodiments, are instead performed by the cloud gateway.

Figure 11A:
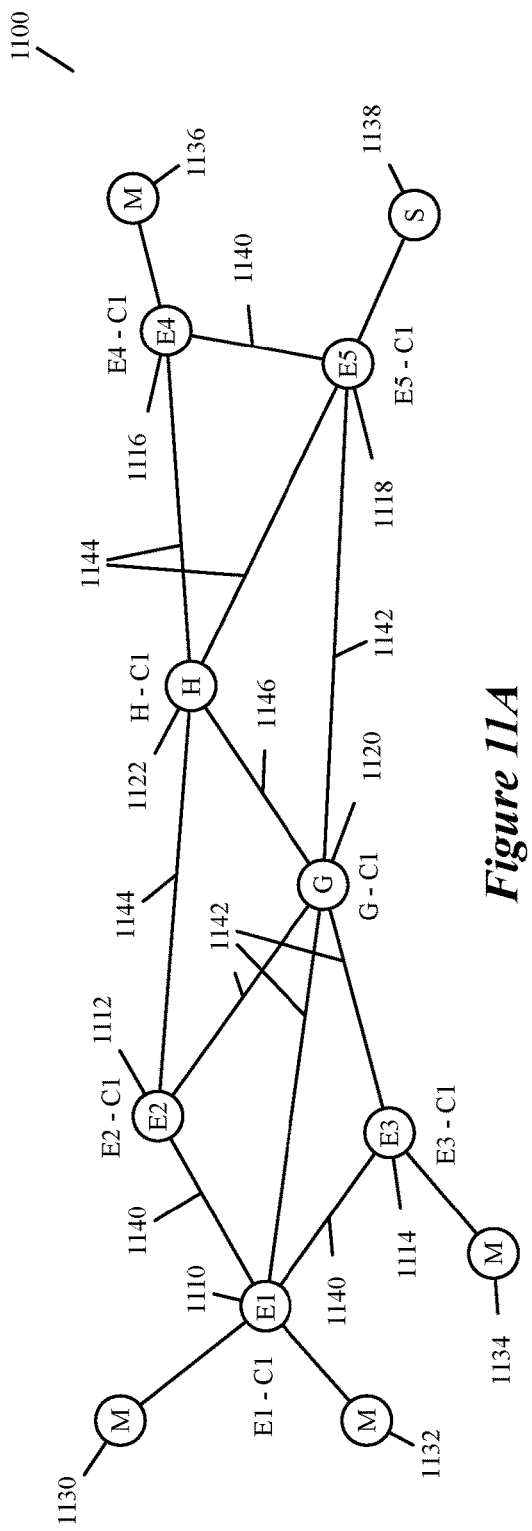
FIGS. 11A-11G illustrate an example of a routing graph generated by a controller to identify all possible routes between a source and destination, according to some embodiments.

FIG. 11A illustrates a routing graph 1100 generated by a controller to identify nodes in a virtual network and the connections between them. The routing graph 1100 includes five edge forwarding nodes (e.g., 1110, 1112, 1114, 1116, and 1118), a gateway forwarding node 1120, and a hub forwarding node 1122. Additionally, the routing graph includes a node 1138 representing an external corporate compute node (e.g., a branch office or datacenter) or SaaS provider accessible through edge forwarding node 1118, and a set of nodes 1130, 1132, 1134, and 1136 representing machines or groups of machines at branch sites served by the edge forwarding nodes 1110-1118. For example, the nodes 1130 and 1132 represent machines that are accessible through edge forwarding node 1110, node 1134 represents machines that are accessible through edge forwarding node 1114, and node 1136 represents machines that are accessible through edge forwarding node 1116.

The routing graph 1100 also illustrates the connections between these forwarding nodes, including links 1140 between edge forwarding nodes, links 1142 between edge forwarding nodes and the gateway forwarding node 1120, links 1144 between edge forwarding nodes and the hub forwarding node 1122, and a link 1146 between the gateway forwarding node 1120 and hub forwarding node 1122. In some embodiments, the controller removes any identified bad links before generating the routing graph 1100.

As described in relation to the process 800, the controller can analyze the routing graph to identify spoke SD-WAN edge forwarding nodes, such as spoke edge forwarding nodes 1110-1118, and determine whether any of the identified spoke edge forwarding nodes should serve as hub forwarding nodes for other edge forwarding nodes. For example, the edge forwarding node 1112 has a connection via a link 1144 to the hub forwarding node 1122, and thus the edge forwarding node 1112 can act as a hub forwarding node for the edge forwarding node 1110 if the connection link 1142 between edge forwarding node 1110 and gateway forwarding node 1120 becomes unreliable. Each node that exists as a hub or spoke in the routing graph 1100 is also illustrated with a cost label indicative of the cost of using each respective node in their primary role (e.g., edge forwarding node 1110 has an associated cost 1 ("E1–C1"), and edge forwarding node 1116 has an associated cost 1 ("E4–C1")).

In some embodiments, for one or more links in the routing graph, the controller computes a link weight score (cost score) as a weighted combination of several computed and provider-specific values. In some embodiments, the weight score is a weighted combination of the link's (1) computed delay value, (2) computed loss value, (3) provider network-connection cost, and (4) provider compute cost. In some embodiments, the provider compute cost is accounted for as the managed forwarding nodes connected by the link are machines (e.g., virtual machines or containers) that execute on host computers in the public cloud datacenter(s). These weight scores, in some embodiments, can be used to determine which edge forwarding nodes would be best suited to serve in their secondary function as hub forwarding nodes.

Figure 11B:
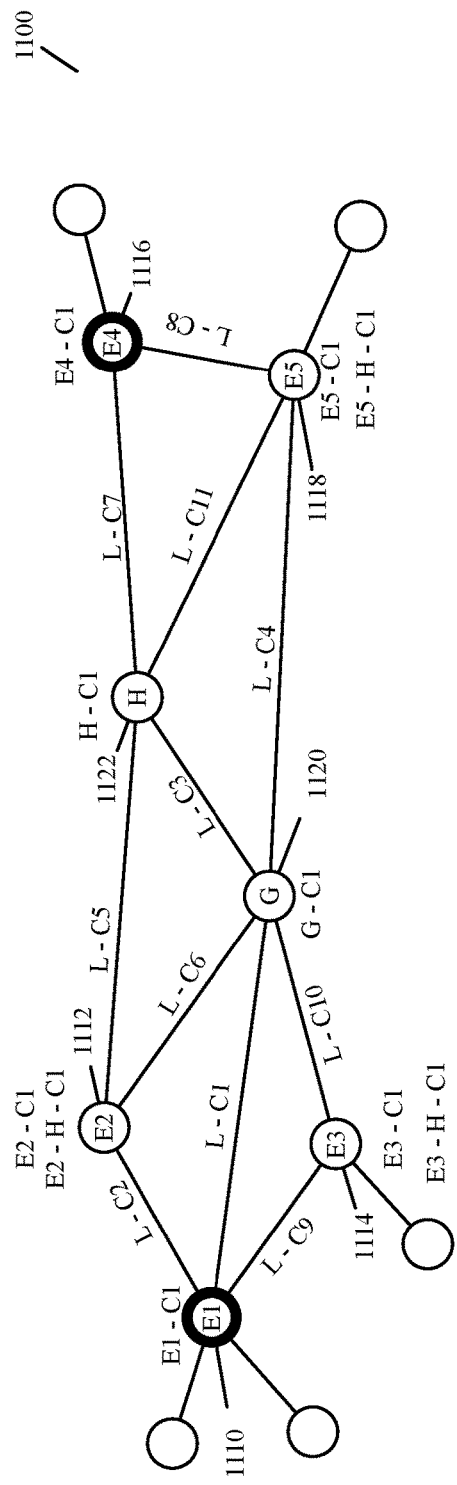

For example, FIG. 11B illustrates the routing graph 1100 with weight scores added to the links for use by the controller to determine the most desirable routes between a source node (e.g., emphasized edge forwarding node 1110) and a destination node (e.g., emphasized gateway forwarding node 1136). For example, the link between edge forwarding node 1110 and gateway forwarding node 1120 has a weight value of L–C1 (i.e., link cost 1), while the link between the edge forwarding node 1110 and the edge forwarding node 1112 has a weight value of L–C2 (i.e., link cost 2). It can be assumed, in some embodiments, that the cost of a link between an edge forwarding node and a designated gateway (e.g., L–C1) under normal conditions is less than the cost of a link between a first edge forwarding node and a second edge forwarding node that is operating in a hub forwarding node role (e.g. L–C2).

In addition to the weight values associated with each link, and the initial cost scores for each of the nodes, edge forwarding nodes 1112, 1114, and 1118 include secondary cost scores representative of the cost of using each of these particular edge forwarding nodes in their secondary functions as hub forwarding nodes (e.g., edge forwarding node 1112 includes a secondary cost E2–H–C1). In some embodiments, it can be assumed that an edge forwarding node's cost score for when the node is operating in its primary function as an edge forwarding node is less than the cost score for when the edge forwarding node is operating in its secondary function as a hub forwarding node. In some such embodiments, it can also be assumed that under normal operating conditions, the cost score for when the edge forwarding node is operating in its secondary function as a hub forwarding node is greater than the cost score associated with a designated hub forwarding node.

Figure 11C:
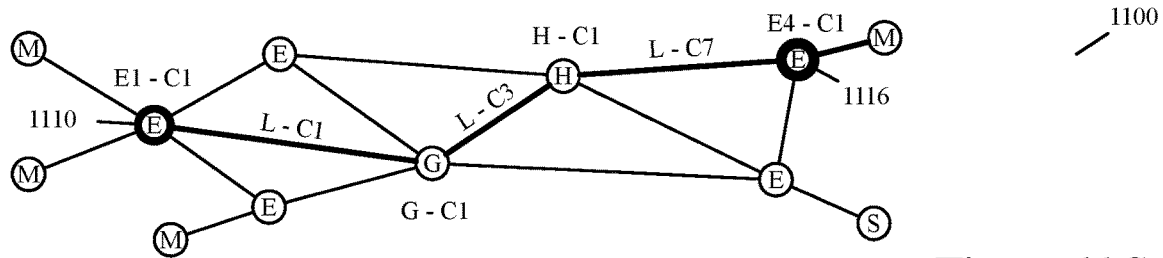

FIG. 11C illustrates the routing graph 1100 over which a first desirable path between the edge forwarding node 1110 and the edge forwarding node 1116 is transposed, represented by the emphasized and labeled links. In this example, each of the forwarding nodes through which traffic would traverse has a cost associated with the primary function of the forwarding node (i.e., none of the edge forwarding nodes in this example are operating as hub forwarding nodes). Thus, the cost of using this particular path is less than the cost of other potential paths, in some embodiments.

Figure 11D:
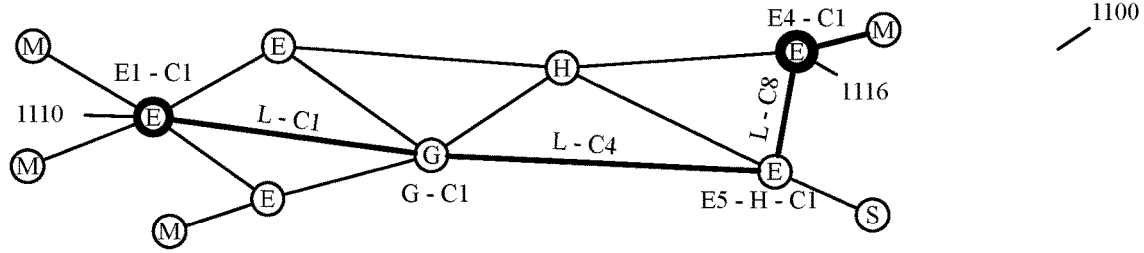

FIG. 11D illustrates the routing graph 1100 over which a second desirable path between the edge forwarding node 1110 and the edge forwarding node 1116 is transposed. In this example, one edge forwarding node (i.e., edge forwarding node 1118) is operating as a hub forwarding node in order to pass traffic from the gateway 1120 to the edge forwarding node 1116.

The decision to augment the role of an edge forwarding node, in some embodiments, is based on a condition faced by another forwarding node that results in that other forwarding node being unable to forward traffic to an intended next hop. For example, a particular forwarding node may be unable to connect to a hub forwarding node due to link degradation, congestion at the hub forwarding node because of another tenant, etc., according to some embodiments. In another example, the controller (or cloud gateway) in some embodiments can detect these conditions by pinging (e.g., sending ICMP messages) a hub forwarding node or set of hub forwarding nodes and detecting a slow response.

In some embodiments, the condition faced by a forwarding node is associated with a specified threshold, such as bandwidth thresholds, connection attempt thresholds (i.e., the number of failed attempts by a forwarding node to connect to another forwarding node), response time thresholds (i.e., how quickly a forwarding node responds to an ICMP message), etc. For example, the decision to augment the role of the edge forwarding node 1118 so that it operates as a hub forwarding node is based on a threshold number of failed connection attempts being exceeded when the gateway forwarding node 1120 tries to connect to the hub forwarding node 1122, in some embodiments. As mentioned above, the failed attempts could be due to congestion caused by heavy traffic from other tenants that use the hub forwarding node 1122, in some embodiments.

As a result of the congestion (or another condition), the controller in some embodiments determines that the cost of using the hub forwarding node 1120 becomes much greater than the cost of using the edge forwarding node 1118 as a hub forwarding node to deliver the traffic to its destination. Alternatively, or conjunctively, the forwarding nodes that experience the conditions make their own alternate route selections using route records provided by the controller (or cloud gateway), according to some embodiments.

In some embodiments, the forwarding nodes make their selections according to policy-based routing (PBR) rules. In some such embodiments, the forwarding nodes include metric generators that generate metrics for resolving the PBR rules. For example, a PBR rule can specify for a source (e.g., a branch office in Los Angeles) that if the traffic destination is X (e.g., a branch office in San Francisco), then the next hop is Y (e.g., a branch office in Fresno) if Y's delay is within 80% of a specified ideal range, and otherwise, the next hop is Z (e.g., a branch office in Las Vegas). Thus, if the edge forwarding node located at the source site determines that Y's delay is not within the range, the edge forwarding node would use Z as its next hop.

Figure 11E:
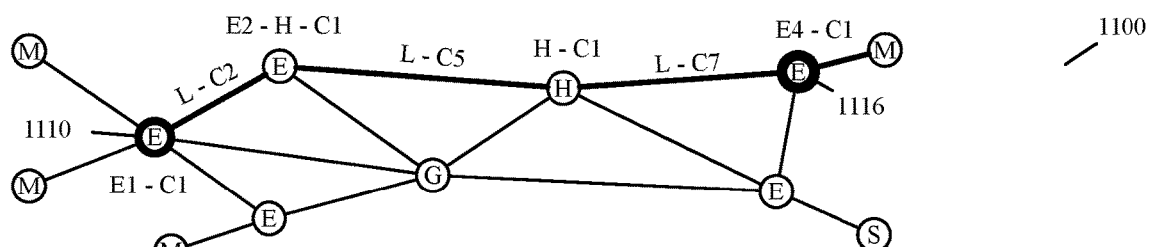

FIG. 11E illustrates the routing graph 1100 over which a third desirable path between the edge forwarding node 1110 and the edge forwarding node 1116 is transposed. Like the example of FIG. 11D, this example includes one edge forwarding node, this time edge forwarding node 1112, that is operating as a hub forwarding node in order to pass traffic from the edge forwarding node 1110 to the hub forwarding node 1122 for eventual delivery to the destination 1116. As the gateway 1120 is a multi-tenant forwarding node like the hub forwarding node 1122, heavy traffic from another tenant could bog down the gateway forwarding node 1120, thus creating a need for an alternate route and off-setting the normally higher cost of using the edge forwarding node 1112 in lieu of the gateway 1120.

Figure 11F:
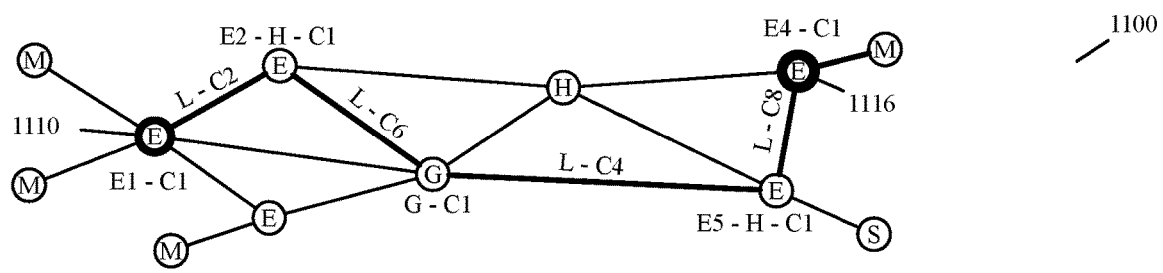

FIG. 11F illustrates the routing graph 1100 over which a fourth desirable path between the edge forwarding node 1110 and the edge forwarding node 1116 is transposed. This fourth path uses the secondary hub functionalities of both the edge forwarding node 1112 and the edge forwarding node 1118. Unlike the examples in FIGS. 11C-11E, the example path in FIG. 11F includes an additional node for the traffic to traverse. It can be deduced that the extra cost of traversing the extra node, in addition to the extra cost of two edge forwarding nodes operating in their secondary functionalities as hub forwarding nodes, is now less than the cost of using the direct link between edge forwarding node 1110 and the gateway 1120 plus the cost of traversing the hub forwarding node 1122, according to some embodiments.

Figure 11G:
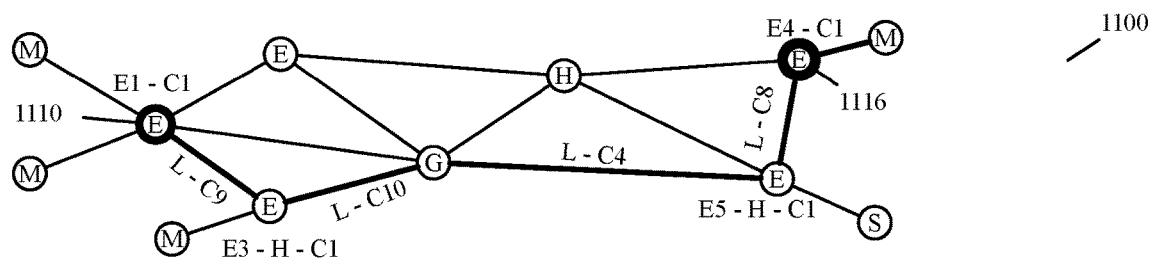

Lastly, FIG. 11G illustrates the routing graph 1100 over which a fifth desirable path (and least desirable of the 5 illustrated) between the edge forwarding node 1110 and the edge forwarding node 1116 is transposed. In this example, two edge forwarding nodes (e.g., 1114 and 1118) are again operating as hub forwarding nodes.

In some embodiments, the cost of using the path illustrated in FIG. 11F may be equal to the path illustrated in FIG. 11G, and other means to determine the best path may be used in lieu of cost. For example, in some embodiments, the controller may associate forwarding nodes with heuristic metrics, such as geolocation, the number of paths to get to a hub, and other path metrics. In some embodiments, the path in FIG. 11F may be more desirable, and less expensive, than the path in FIG. 11G based on the potential for additional traffic to edge forwarding node 1114, which provides access to the gateway forwarding node 1134 of an external site. While the example paths provided above are limited, the controller in some embodiments identifies every potential path between a source and destination, and selects the best path.

As mentioned above, different embodiments generate and utilize routing graphs differently. For instance, some embodiments only define one routing graph but allow edge nodes to serves as either edge forwarding nodes or as hub forwarding nodes by providing two different costs for each such edge node for the two different capacities under which it could operate (i.e., a first cost when it operates as an edge forwarding node and a second cost when it operates as a hub forwarding node). These embodiments then perform path searches on this common routing graph to conjunctively identify for pairs of sites connected by the SD-WAN (1) routes that use a particular edge node as only an edge forwarding node and (2) routes that also use the particular edge node as a hub forwarding element.

Figure 12:
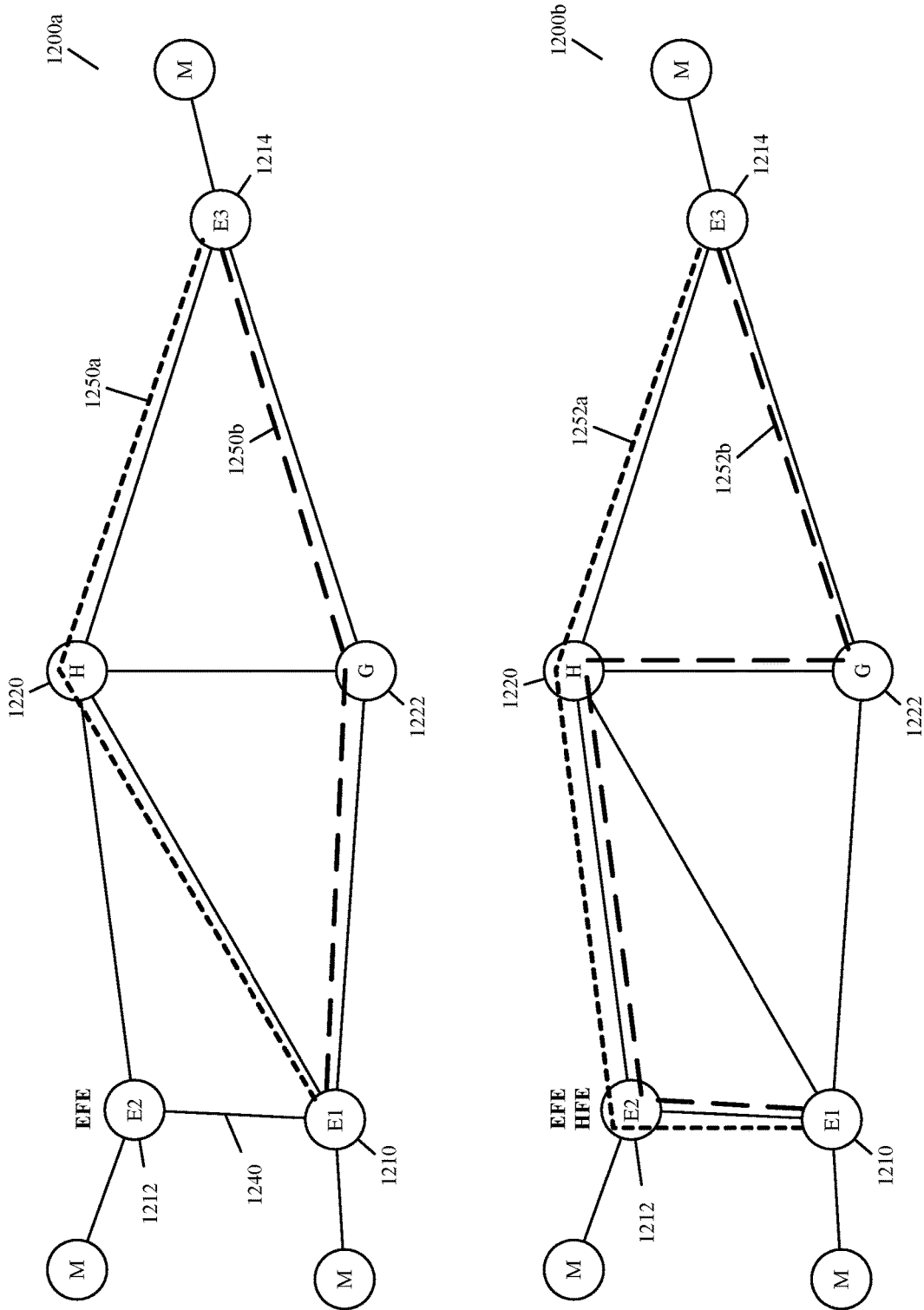
FIG. 12 illustrates an example of two routing graphs generated for an SD-WAN that treat one edge node differently.

Other embodiments, on the other hand, define two routing graphs with one routing graph not treating any edge forwarding node as a hub node, while the other routing graph allows the edge nodes to be edge forwarding nodes and hub forwarding nodes for some or all other edge nodes. These embodiments perform path searches on each routing graph to identify optimal routes between each pair of sites connected by the SD-WAN. FIG. 12 illustrates an example of two routing graphs 1200a and 1200b generated for an SD-WAN that treat one edge node 1212 ("E2") differently. In graph 1200a, the edge node 1212 is designated only with the acronym EFE to identify that it only operates as an edge forwarding element. As such, in this routing graph, node 1212 cannot be used to define routes from node 1210 to node 1214 (i.e., via link 1240), and instead all possible routes must pass through the hub node 1220 and/or the cloud gateway node 1222, as highlighted by the overlaid example routes 1250a and 1250b.

In the second graph 1200b, the edge node 1212 is designated with both the acronyms EFE and HFE to identify that it can operate as an edge forwarding element and a hub forwarding element. As such, in this routing graph, node 1212 can be used to define routes from node 1210 to node 1214 (i.e., via link 1240) as highlighted by the overlaid routes 1252a and 1252b that are shown from node 1210 to node 1214 through the node 1212. In some embodiments, different costs are associated with the node 1212 acting as an EFE or HFE, as described above with reference to FIGS. 11A-11G.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
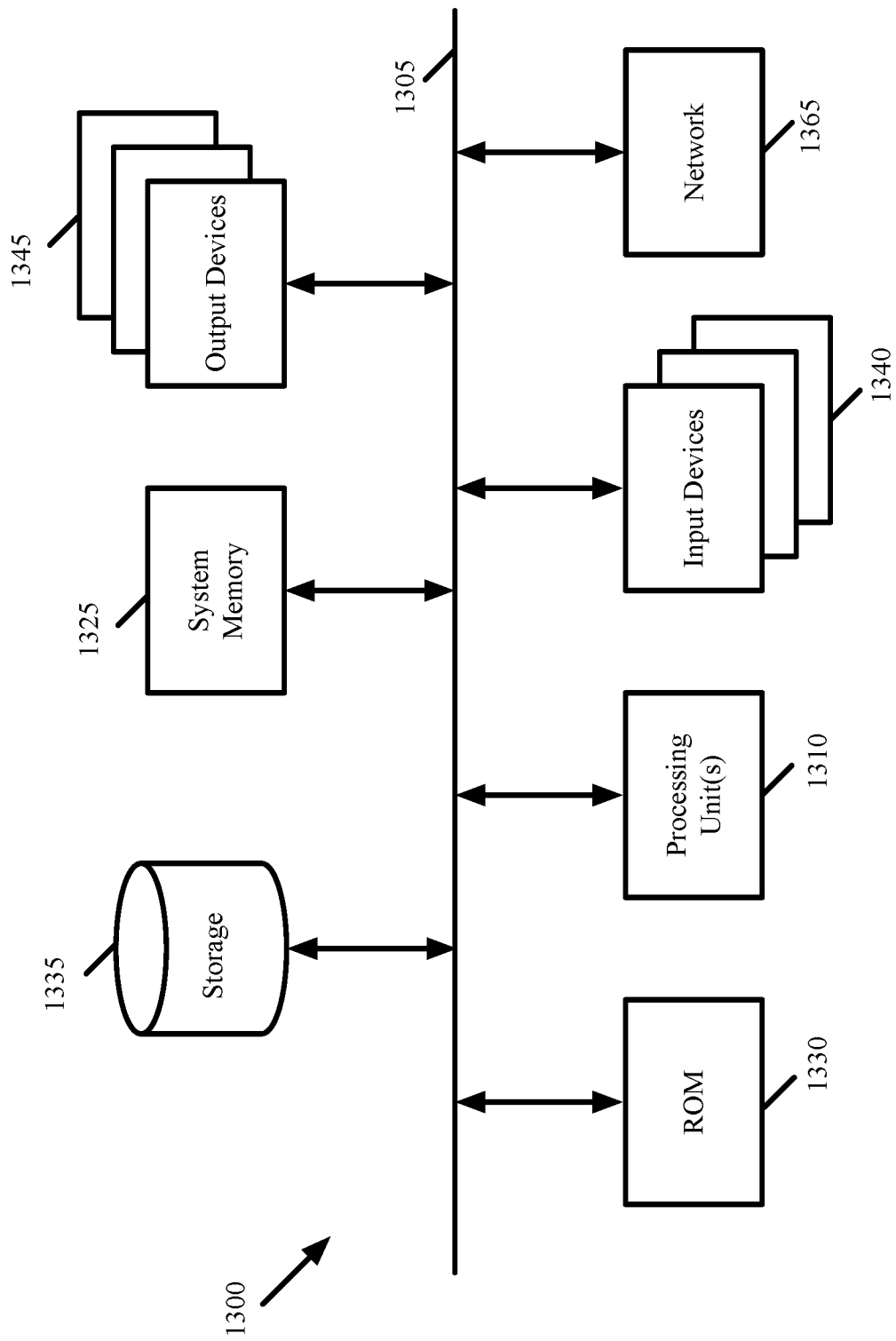
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the computer system. The input devices 1340 include alphanumeric keyboards and pointing devices (also called "cursor control devices"). The output devices 1345 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 13, bus 1305 also couples computer system 1300 to a network 1365 through a network adapter (not shown). In this manner, the computer can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's virtual private cloud datacenters (e.g., datacenters that the third party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of facilitating routing through a software-defined wide area network (SD-WAN) defined for an entity, the SD-WAN comprising (i) at least one datacenter site comprising a hub forwarding node and a plurality of server machines and (ii) two or more multi-user compute sites each comprising one edge forwarding node to connect multiple user machines at their respective sites to the SD-WAN, the method comprising:

generating a routing graph to search to identify multiple routes between forwarding nodes, the routing graph comprising a node for each forwarding node;

using the routing graph to perform a set of path searches to identify first and second sets of routes between the forwarding nodes, said using comprising associating a first cost with the first set of routes using a first edge forwarding node at a first multi-user compute site only as an edge forwarding element for connecting user machines at the first site to machines outside of the first site, and a second cost with the second set of routes using the first edge forwarding node as a hub forwarding node to connect user machines at at least a second site to machines outside of the first and second sites, the first set of routes using the first edge forwarding node only as an edge forwarding element while the second set of routes use the first edge forwarding node as a hub forwarding element;

generating first and second sets of route records to implement the identified first and second sets of routes; and distributing to different forwarding nodes subsets of the first and second sets of routes, wherein the first edge forwarding node receives (i) edge-node route records for a first set of packets to and from the machines at the first site from and to machines outside of the first site, and (ii) hub-node route records for forwarding a second set of packets from a second site to a third site, the first edge forwarding node operating as an edge forwarding node for the SD-WAN when the first edge forwarding node forwards the first set of packets and operating as a hub forwarding node for the SD-WAN when the first edge forwarding node forwards the second set of packets.

2. The method of claim 1, wherein each edge forwarding node at each of the two or more multi-user sites serve as spoke nodes in a hub-and-spoke architecture that use the hub forwarding node at the datacenter site.

3. The method of claim 1, wherein the second set of packets comprises packets that require traversing the first multi-user compute site via the first edge forwarding node operating as a hub forwarding node in order to reach a particular destination.

4. The method of claim 3, wherein the packets require traversing the first multi-user compute site via the first edge forwarding node operating as a hub forwarding node after a second edge forwarding node for the second site experiences a particular condition.

5. The method of claim 4, wherein the particular condition is associated with a specified threshold value, wherein when the particular condition exceeds the specified threshold value, the second edge forwarding node selects a route from the second set of routes in which the first edge forwarding node operates as a hub forwarding node.

6. The method of claim 5, wherein the particular condition comprises congestion at the hub forwarding node at the datacenter site, wherein the associated specified threshold value comprises a specified number of failed attempts to connect to the hub forwarding node at the data center site.

7. The method of claim 6, wherein the entity is a first tenant of a plurality of tenants and the hub forwarding node at the datacenter site is a multi-tenant hub forwarding node for the plurality of tenants, wherein the congestion at the hub forwarding node at the data center site is caused by a second tenant in the plurality of tenants.

8. The method of claim 5, wherein the second cost is higher than the first cost, wherein:
when the specified threshold value associated with the particular condition is not exceeded, the second edge forwarding node does not use the first edge forwarding node as a hub forwarding node; and
when the specified threshold value associated with the particular condition is exceeded, the second edge forwarding node uses the first edge forwarding node as a hub forwarding node.

9. The method of claim 1, wherein the method is performed by a controller for the SD-WAN.

10. The method of claim 9, wherein the controller is a cloud gateway of the SD-WAN.

11. The method of claim 1, wherein the method is performed by a framework comprising a controller and a cloud gateway.

12. The method of claim 1, wherein operating as a hub forwarding node for the SD-WAN comprises establishes at least one tunnel with the second edge forwarding node for receiving the second set of packets.

13. The method of claim 12, wherein the at least one tunnel is a secure tunnel.

14. The method of claim 1, wherein each edge forwarding node in the SD-WAN is associated with a set of SD-WAN profiles, each SD-WAN profile identifying at least one of a shared set of security, service, and policy parameters.

15. The method of claim 14, wherein using the routing graph to perform the set of path searches to identify first and second sets of routes between the forwarding nodes comprises using the set of SD-WAN profiles to identify one or more edge forwarding nodes to serve as hub forwarding nodes for the SD-WAN.

16. The method of claim 1, wherein the machines at the multi-user compute sites comprise computers and handheld devices.

17. The method of claim 1, wherein machines outside of the first and second sites comprise server machines in datacenters.

18. The method of claim 1, wherein machines outside of the first and second sites comprise user machines at a third multi-user compute site.

19. The method of claim 1, wherein machines outside of the first and second sites comprise server machines at a third multi-user compute site.

20. The method of claim 1, wherein each multi-user compute site comprises at least one building in which multiple computers of multiple users operate and access the SD-WAN through the edge forwarding node deployed at a respective site.

* * * * *